(12) United States Patent
Camim et al.

(10) Patent No.: US 12,730,922 B1
(45) Date of Patent: Sep. 8, 2026

(54) DATABASE CONTAINER

(71) Applicant: Notion Labs, Inc., San Francisco, CA (US)

(72) Inventors: Marina Schimidinger Camim, San Francisco, CA (US); Ken Chen, San Francisco, CA (US); James Wills, San Francisco, CA (US); Atul Varma, San Francisco, CA (US); Michelle Lim, New York, NY (US); Emily Hong, New York, NY (US); Ron Offer Yehoshua, Oakland, CA (US)

(73) Assignee: Notion Labs, Inc., San Francisco, CA (US)

( * ) Notice: Subject to any disclaimer, the term of this patent is extended or adjusted under 35 U.S.C. 154(b) by 0 days.

(21) Appl. No.: 19/442,842

(22) Filed: Jan. 7, 2026

Related U.S. Application Data

(60) Provisional application No. 63/874,532, filed on Sep. 2, 2025.

(51) Int. Cl.
*G06F 21/00* (2013.01)
*G06F 21/62* (2013.01)

(52) U.S. Cl.
CPC ................................ *G06F 21/6218* (2013.01)

(58) Field of Classification Search
CPC .................................................. G06F 21/6218
See application file for complete search history.

(56) References Cited

U.S. PATENT DOCUMENTS

| | | | | |
|---|---|---|---|---|
| 9,747,168 | B2 * | 8/2017 | Haustein | G06F 11/1451 |
| 10,452,646 | B2 * | 10/2019 | Schlarb | G06F 16/248 |
| 10,482,080 | B2 * | 11/2019 | Auer | G06F 16/2365 |
| 11,561,956 | B2 * | 1/2023 | Auer | G06F 16/215 |
| 12,549,561 | B2 * | 2/2026 | Goff | H04L 63/108 |
| 2014/0095546 | A1 * | 4/2014 | Kruglikov | G06F 3/067 707/784 |
| 2017/0322990 | A1 * | 11/2017 | Tran | G06F 16/258 |
| 2017/0323112 | A1 * | 11/2017 | Tran | G06F 16/258 |
| 2019/0129991 | A1 * | 5/2019 | Auer | G06F 16/2365 |
| 2019/0130121 | A1 * | 5/2019 | Birn | G06F 40/177 |
| 2023/0063911 | A1 * | 3/2023 | Carru | G06F 16/256 |

* cited by examiner

*Primary Examiner* — John B King
(74) *Attorney, Agent, or Firm* — Perkins Coie LLP; Alberto Araiza; Lena Petrovic

(57) ABSTRACT

The present disclosure provides a database container configured to contain multiple data sources. A first command is received to add a new data source to the database container. In response, the new data source is created within the database container, where the database container acts as a parent such that the new data source inherits properties of the database container including a first set of access permissions. Display of the new data source is caused via the database container. The system receives a second command to link an existing data source residing outside the database container to the database container. In response, a view of the existing data source is created within the database container without containing the existing data source, causing the existing data source to retain a second set of access permissions different from the first set of access permissions.

20 Claims, 15 Drawing Sheets

900A

DATABASE CONTAINER

CROSS-REFERENCE TO RELATED APPLICATION(S)

This application claims priority to and the benefits of U.S. Provisional Application No. 63/874,532, titled "DATABASE CONTAINERS" filed on Sep. 2, 2025. The content of the aforementioned application is herein incorporated by reference in its entirety.

BACKGROUND

Workspaces (e.g., digital workspaces) can refer to environments that assemble tools and platforms that allow users to communicate and collaborate on work products. Workspaces can be included in desktops of web-based applications that allow multiple users to share and access content of the workspaces in a variety of manners. Workspaces can include complications of electronic documents that can be organized within the workspaces.

BRIEF DESCRIPTION OF THE DRAWINGS

Reference will now be made, by way of example, to the accompanying drawings, which show example embodiments of the present application, and in which.

Figure 1:
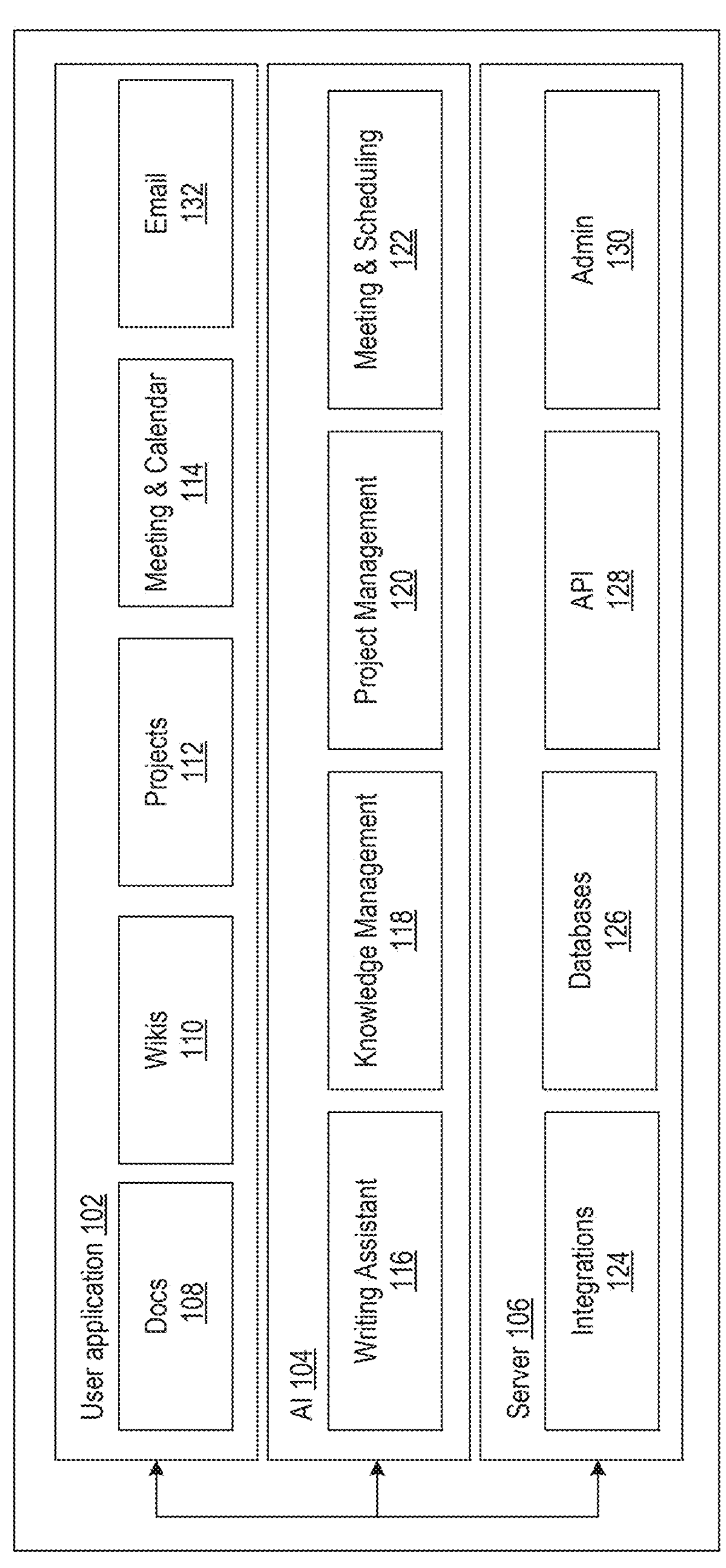
FIG. 1 is a block diagram illustrating a platform, which may be used to implement examples of the present disclosure.

The technologies described herein will become more apparent to those skilled in the art by studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The present technology includes database containers for a workspace application. The database containers allow for hierarchical organization of multiple data sources (e.g., databases). The database container is a logical container of data sources (a "container" generally or "data source container" alternatively). The database container provides options to contain the data sources within the database container or link existing data sources of the workspace application to the database container. The differences between containing the data sources within the database container and linking existing data sources to the database container are fundamental to the storage, manipulation, and management of data within the workspace application. Contained data sources can reside fully within the database container. Database containers can act as parent to contained data sources, causing the contained data sources to inherit properties and/or sets of properties from the container, including access permissions.

In contrast, conventional database management systems have drawbacks including organizational and administrative challenges that limit their effectiveness for complex data workflows. These systems require manual management of multiple databases as separate, independent entities with respective properties, data organizations, and administrative controls. Connections between data sources containing related or cross-relevant data are often absent, even when the connections would likely enhance the ability of the systems to organize, manipulate, and present data. The lack of a unified organization mechanism becomes particularly problematic in collaborative environments such as workspaces, where users and/or groups of users work with interconnected data sources that would benefit from being managed as cohesive or connected units. Moreover, conventional systems often require switching between different database views or interfaces to accomplish tasks that involve interconnected data, potentially disrupting a workflow continuity and/or reducing productivity. These systems thus require a choice between completely independent databases or full integration, with no in-between or hybrid approach.

The disclosed database container includes functionality to add, relate, or link data sources to the database container as a unified mechanism for management within a workspace. The database container can be configured to contain multiple data sources. The database container can provide organization capabilities that allow multiple data sources to be managed collectively as a unit rather than as separate, independent entities. However, the data sources contained within the database container can be managed individually, providing flexibility in data management.

In one aspect of the disclosed technology, a new data source is added to a database container of the workspace application in response to receiving a corresponding command at the workspace application. The new data source is contained within the database container, which acts as a parent such that the new data source inherits properties of the database container including a set of access permissions. This inheritance mechanism can ensure that the new data source automatically adopts characteristics of the database container, improving an efficiency of database management within the workspace application by removing a need to individually configure each data source. In some embodiments, the new data source is displayed at the database container. For example, the workspace application can provide an interface for accessing and/or managing the database container and contained data source(s).

In another aspect of the disclosed technology, the system receives a command to create a relation between the new data source and another, second data source of the workspace application. The second data source is either contained within the database container or contained outside of the database container but within the workspace application. In response to the command, the relation is created between the new data source and the second data source. The relation causes display of the second data source within a relation column of the new data source. The relation can be a two-way relation, which can cause display of both the new data source within a relation column of the second data source and the second data source within a relation column of the new data source.

In another aspect of the disclosed technology, the system receives a command to link an existing data source of the workspace application to the database container. The existing data source resides outside of the database container but within the workspace application. The present technology can accommodate scenarios where there is a need to access external databases (or data sources) within the database container while preserving those databases' properties and/or access permissions. Further, the present technology can allow an external database, located outside of the workspace application, to be linked to the database container. Linking external databases, such as those located outside of the workspace application, improves an ease of and/or expands the capability of managing complex data structures and/or workflows within the workspace application.

The present technology also provides new mechanisms for viewing data sources in the database container. For example, a view of the existing data source can be created within the database container without the existing data source being contained within the database container, and the existing data source can be caused to retain a second set of access permissions different from the first set of access permissions. The ability of the database container to include both contained data sources and linked data sources provides users of the workspace application with the capability to integrate categorically related databases by containing them within the database container while maintaining access to external databases through linking the external databases to the database container without disrupting existing configurations.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail to avoid unnecessarily obscuring the descriptions of examples.

Block Data Model

The disclosed technology includes a block data model ("block model"). The blocks are dynamic units of information that can be transformed into other block types and move across workspaces. The block model allows users to customize how their information is moved, organized, and shared. Hence, blocks contain information but are not siloed.

Blocks are singular pieces that represent all units of information inside an editor. In one example, text, images, lists, a row in a database, etc., are all blocks in a workspace. The attributes of a block determine how that information is rendered and organized. Every block can have attributes including an identifier (ID), properties, and type. Each block is uniquely identifiable by its ID. The properties can include a data structure containing custom attributes about a specific block. An example of a property is "title," which stores text content of block types such as paragraphs, lists, and the title of a page. More elaborate block types require additional or different properties, such as a page block in a database with user-defined properties. Every block can have a type, which defines how a block is displayed and how the block's properties are interpreted.

A block has attributes that define its relationship with other blocks. For example, the attribute "content" is an array (or ordered set) of block IDs representing the content inside a block, such as nested bullet items in a bulleted list or the text inside a toggle. The attribute "parent" is the block ID of a block's parent, which can be used for permissions. Blocks can be combined with other blocks to track progress and hold all project information in one place.

A block type is what specifies how the block is rendered in a user interface (UI), and the block's properties and content are interpreted differently depending on that type. Changing the type of a block does not change the block's properties or content—it only changes the type attribute. The information is thus rendered differently or even ignored if the property is not used by that block type. Decoupling property storage from block type allows for efficient transformation and changes to rendering logic and is useful for collaboration.

Blocks can be nested inside of other blocks (e.g., infinitely nested sub-pages inside of pages). The content attribute of a block stores the array of block IDs (or pointers) referencing those nested blocks. Each block defines the position and order in which its content blocks are rendered. This hierarchical relationship between blocks and their render children are referred to herein as a "render tree." In one example, page blocks display their content in a new page, instead of rendering it indented in the current page. To see this content, a user would need to click into the new page.

In the block model, indentation is structural (e.g., reflects the structure of the render tree). In other words, when a user indents something, the user is manipulating relationships between blocks and their content, not just adding a style. For example, pressing Indent in a content block can add that block to the content of the nearest sibling block in the content tree.

Blocks can inherit permissions of blocks in which they are located (which are above them in the tree). Consider a page: to read its contents, a user must be able to read the blocks within that page. However, there are two reasons one cannot use the content array to build the permissions system. First, blocks are allowed to be referenced by multiple content arrays to simplify collaboration and a concurrency model. But because a block can be referenced in multiple places, it is ambiguous which block it would inherit permissions from. The second reason is mechanical. To implement permission checks for a block, one needs to look up the tree, getting that block's ancestors all the way up to the root of the tree (which is the workspace). Trying to find this ancestor path by searching through all blocks' content arrays is inefficient, especially on the client. Instead, the model uses an "upward pointer"—the parent attribute—for the permission system. The upward parent pointers and the downward content pointers mirror each other.

A block's life starts on the client. When a user takes an action in the interface-typing in the editor, dragging blocks around a page—these changes are expressed as operations that create or update a single record. The "records" refer to persisted data, such as blocks, users, workspaces, etc. Because many actions usually change more than one record, operations are batched into transactions that are committed (or rejected) by the server as a group.

Creating and updating blocks can be performed by, for example, pressing Enter on a keyboard. First, the client defines all the initial attributes of the block, generating a new unique ID, setting the appropriate block type (to_do), and filling in the block's properties (an empty title, and checked: [["No"]]). The client builds operations to represent the creation of a new block with those attributes. New blocks are not created in isolation: blocks are also added to their parent's content array, so they are in the correct position in the content tree. As such, the client also generates an operation to do so. All these individual change operations are grouped into a transaction. Then, the client applies the operations in the transaction to its local state. New block objects are created in memory and existing blocks are modified. In native apps, the model caches all records that are accessed locally in an LRU (least recently used) cache on top of SQLite or IndexedDB, referred to as RecordCache. When records are changed on a native app, the model also updates the local copies in RecordCache. The editor re-renders to draw the newly created block onto the display. At the same time, the transaction is saved into TransactionQueue, the part of the client responsible for sending all transactions to the model's servers so that the data is persisted and shared with collaborators. TransactionQueue stores transactions safely in IndexedDB or SQLite (depending on the platform) until they are persisted by the server or rejected.

A block can be saved on a server to be shared with others. Usually, TransactionQueue sits empty, so the transaction to create the block is sent to the server in an application programming interface (API) request. In one example, the transaction data is serialized to JSON and posted to the/saveTransactions API endpoint. SaveTransactions gets the data into source-of-truth databases, which store all block data as well as other kinds of persisted records. Once the request reaches the API server, all the blocks and parents involved in the transaction are loaded. This gives a "before" picture in memory. The block model duplicates the "before" data that had just been loaded in memory. Next, the block model applies the operations in the transaction to the new copy to create the "after" data. Then the model uses both "before" and "after" data to validate the changes for permissions and data coherency. If everything checks out, all created or changed records are committed to the database-meaning the block has now officially been created. At this point, a "success" HTTP response to the original API request is sent by the client. This confirms that the client knows the transaction was saved successfully and that it can move on to saving the next transaction in the TransactionQueue. In the background, the block model schedules additional work depending on the kind of change made for the transaction. For example, the block model can schedule version history snapshots and indexing block text for a Quick Find function. The block model also notifies MessageStore, which is a real-time updates service, about the changes that were made.

The block model provides real-time updates to, for example, almost instantaneously show new blocks to members of a teamspace. Every client can have a long-lived WebSocket connection to the MessageStore. When the client renders a block (or page, or any other kind of record), the client subscribes to changes of that record from MessageStore using the WebSocket connection. When a team member opens the same page, the member is subscribed to changes of all those blocks. After changes have been made through the saveTransactions process, the API notifies MessageStore of new recorded versions. MessageStore finds client connections subscribed to those changing records and passes on the new version through their WebSocket connection. When a team member's client receives version update notifications from MessageStore, it verifies that version of the block in its local cache. Because the versions from the notification and the local block are different, the client sends a syncRecordValues API request to the server with the list of outdated client records. The server responds with the new record data. The client uses this response data to update the local cache with the new version of the records, then re-renders the user interface to display the latest block data.

Blocks can be shared instantaneously with collaborators. In one example, a page is loaded using only local data. On the web, block data is pulled from being in memory. On native apps, loading blocks that are not in memory are loaded from the RecordCache persisted storage. However, if missing block data is needed, the data is requested from an API. The API method for loading the data for a page is referred to herein as loadPageChunk; it descends from a starting point (likely the block ID of a page block) down the content tree and returns the blocks in the content tree plus any dependent records needed to properly render those blocks. Several layers of caching for loadPageChunk are used, but in the worst case, this API might need to make multiple trips to the database as it recursively crawls down the tree to find blocks and their record dependencies. All data loaded by loadPageChunk is put into memory (and saved in the RecordCache if using the app). Once the data is in memory, the page is laid out and rendered using React.

Software Platform

FIG. 1 is a block diagram of an example platform 100. The platform 100 provides users with an all-in-one workspace for data and project management. The platform 100 can include a user application 102, an artificial intelligence (AI) tool 104, and a server 106. The user application 102, the AI tool 104, and the server 106 are in communication with each other via a network.

In some implementations, the user application 102 is a cross-platform software application configured to work on several computing platforms and web browsers. The user application 102 can include a variety of templates. A template refers to a prebuilt page that a user can add to a workspace within the user application 102. The templates can be directed to a variety of functions. Exemplary templates include a docs template 108, a wikis template 110, a projects template 112, a meeting and calendar template 114, and an email template 132. In some implementations, a user can generate, save, and share customized templates with other users.

The user application 102 templates can be based on content "blocks." For example, the templates of the user application 102 include a predefined and/or pre-organized set of blocks that can be customized by the user. Blocks are content containers within a template that can include text, images, objects, tables, maps, emails, and/or other pages (e.g., nested pages or sub-pages). Blocks can be assigned to certain properties. The blocks are defined by boundaries having dimensions. The boundaries can be visible or non-visible for users. For example, a block can be assigned as a text block (e.g., a block including text content), a heading block (e.g., a block including a heading), or a sub-heading block having a specific location and style to assist in organizing a page. A block can be assigned as a list block to include content in a list format. A block can be assigned as an AI prompt block (also referred to as a "prompt block") that enables a user to provide instructions (e.g., prompts) to the AI tool 104 to perform functions. A block can also be assigned to include audio, video, or image content.

A user can add, edit, and remove content from the blocks. The user can also organize the content within a page by moving the blocks around. In some implementations, the blocks are shared (e.g., by copying and pasting) between the different templates within a workspace. For example, a block embedded within multiple templates can be configured to show edits synchronously.

The docs template 108 is a document generation and organization tool that can be used for generating a variety of documents. For example, the docs template 108 can be used to generate pages that are easy to organize, navigate, and format. The wikis template 110 is a knowledge management application having features similar to the pages generated by the docs template 108 but that can additionally be used as a database. The wikis template 110 can include, for example, tags configured to categorize pages by topic and/or include an indication of whether the provided information is verified to indicate its accuracy and reliability. The projects template 112 is a project management and note-taking software tool. The projects template 112 can allow the users, either as individuals or as teams, to plan, manage, and execute projects in a single forum. The meeting and calendar template 114 is a tool for managing tasks and timelines. In addition to traditional calendar features, the meeting and calendar template 114 can include blocks for categorizing and prioritizing scheduled tasks, generating to-do and action item lists, tracking productivity, etc. The various templates of the user application 102 can be included under a single workspace and include synchronized blocks. For example, a user can update a project deadline on the projects template 112, which can be automatically synchronized to the meeting and calendar template 114. The various templates of the user application 102 can be shared within a team, allowing multiple users to modify and update the workspace concurrently.

The email template 132 allows the users to customize their inbox by representing the inbox as a customizable database where the user can add custom columns and create custom views with layouts. One view can include multiple layouts including a calendar layout, a summary layout, and an urgent information layout. Each view can include a customized structure including custom criteria, custom properties, and custom actions. The custom properties can be specific to a view such as AI-extracted properties and/or heuristic-based properties. The custom actions can trigger automatically when a message enters the view. The custom actions can include deterministic rules like "Archive this," or assistant workflows like responding to support messages by searching user applications 102 or filing support tickets. In addition, the view can include actions, such as buttons, that are custom to the view and perform operations on the messages in the inbox. Only the customized structure can be shared with other users of the system, or both the customized structure and the messages can be shared.

The integration of the docs template 108, the wikis template 110, the projects template 112, the meeting and calendar template 114, and the email template 132 enables linking and embedding of templates within other templates. For example, an email sent from an email address within the platform 100 to another email address within the platform 100 can include an embedding of a document within the platform 100, or an embedding of a block within the document. In another example, a wiki can link to a meeting within the calendar.

The AI tool 104 is an integrated AI assistant that enables AI-based functions for the user application 102. In one example, the AI tool 104 is based on a neural network architecture, such as the transformer 212 described in relation to FIG. 2. The AI tool 104 can interact with blocks embedded within the templates on a workspace of the user application 102. For example, the AI tool 104 can include a writing assistant tool 116, a knowledge management tool 118, a project management tool 120, and a meeting and scheduling tool 122. The different tools of the AI tool 104 can be interconnected and interact with different blocks and templates of the user application 102.

The writing assistant tool 116 can operate as a generative AI tool for creating content for the blocks in accordance with instructions received from a user. Creating the content can include, for example, summarizing, generating new text, or brainstorming ideas. For example, in response to a prompt received as a user input that instructs the AI to describe what the climate is like in New York, the writing assistant tool 116 can generate a block including text that describes the climate in New York. As another example, in response to a prompt that requests ideas on how to name a pet, the writing assistant tool 116 can generate a block including a list of creative pet names. The writing assistant tool 116 can also operate to modify existing text. For example, the writing assistant can shorten, lengthen, or translate existing text, correct grammar and typographical errors, or modify the style of the text (e.g., a social media style versus a formal style).

The knowledge management tool 118 can use AI to categorize, organize, and share knowledge included in the workspace. In some implementations, the knowledge management tool 118 can operate as a question-and-answer assistant. For example, a user can provide instructions on a prompt block to ask a question. In response to receiving the question, the knowledge management tool 118 can provide an answer to the question, for example, based on information included in the wikis template 110. The project management tool 120 can provide AI support for the projects template 112. The AI support can include autofilling information based on changes within the workspace or automatically tracking project development. For example, the project management tool 120 can use AI for task automation, data analysis, real-time monitoring of project development, allocation of resources, and/or risk mitigation. The meeting and scheduling tool 122 can use AI to organize meeting notes, unify meeting records, list key information from meeting minutes, and/or connect meeting notes with deliverable deadlines.

The server 106 can include various units (e.g., including compute and storage units) that enable the operations of the AI tool 104 and workspaces of the user application 102. The server 106 can include an integrations unit 124, an application programming interface (API) 128, databases 126, and an administration (admin) unit 130. The databases 126 are configured to store data associated with the blocks. The data associated with the blocks can include information about the content included in the blocks, the function associated with the blocks, and/or any other information related to the blocks. The API 128 can be configured to communicate the block data between the user application 102, the AI tool 104, and the databases 126. The API 128 can also be configured to communicate with remote server systems, such as AI systems. For example, when a user performs a transaction within a block of a template of the user application 102 (e.g., in a docs template 108), the API 128 processes the transaction and saves the changes associated with the transaction to the database 126. The integrations unit 124 is a tool connecting the platform 100 with external systems and software platforms. Such external systems and platforms can include other databases (e.g., cloud storage spaces), messaging software applications, or audio or video conference applications. The administration unit 130 is configured to manage and maintain the operations and tasks of the server 106. For example, the administration unit 130 can manage user accounts, data storage, security, performance monitoring, etc.

Transformer for Neural Network

To assist in understanding the present disclosure, some concepts relevant to neural networks and machine learning (ML) are discussed herein. Generally, a neural network comprises a number of computation units (sometimes referred to as "neurons"). Each neuron receives an input value and applies a function to the input to generate an output value. The function typically includes a parameter (also referred to as a "weight") whose value is learned through the process of training. Multiple neurons may be organized into a neural network layer (or simply "layer") and there may be multiple such layers in a neural network. The output of one layer may be provided as input to a subsequent layer. Thus, input to a neural network may be processed through a succession of layers until an output of the neural network is generated by a final layer. This is a simplistic discussion of neural networks and there may be more complex neural network designs that include feedback connections, skip connections, and/or other such possible connections between neurons and/or layers, which are not discussed in detail here.

A deep neural network (DNN) is a type of neural network having multiple layers and/or a large number of neurons. The term DNN can encompass any neural network having multiple layers, including convolutional neural networks (CNNs), recurrent neural networks (RNNs), multilayer perceptrons (MLPs), Generative Adversarial Networks (GANs), Variational Autoencoders (VAEs), and Auto-regressive Models, among others. Unlike discriminative models, generative models are distinguished by their ability to create new, synthetic data that closely resembles the training data. In contrast, discriminative models focus on predicting labels for given inputs.

DNNs are often used as ML-based models for modeling complex behaviors (e.g., human language, image recognition, object classification) in order to improve the accuracy of outputs (e.g., more accurate predictions) such as, for example, as compared with models with fewer layers. In the present disclosure, the term "ML-based model" or more simply "ML model" may be understood to refer to a DNN. Training an ML model refers to a process of learning the values of the parameters (or weights) of the neurons in the layers such that the ML model is able to model the target behavior to a desired degree of accuracy. Training typically requires the use of a training dataset, which is a set of data that is relevant to the target behavior of the ML model.

As an example, to train an ML model that is intended to model human language (also referred to as a "language model"), the training dataset may be a collection of text documents, referred to as a "text corpus" (or simply referred to as a "corpus"). The corpus may represent a language domain (e.g., a single language), a subject domain (e.g., scientific papers), and/or may encompass another domain or domains, be they larger or smaller than a single language or subject domain. For example, a relatively large, multilingual, and non-subject-specific corpus can be created by extracting text from online webpages and/or publicly available social media posts. Training data can be annotated with ground truth labels (e.g., each data entry in the training dataset can be paired with a label) or may be unlabeled.

Training an ML model generally involves inputting into an ML model (e.g., an untrained ML model) training data to be processed by the ML model, processing the training data using the ML model, collecting the output generated by the ML model (e.g., based on the inputted training data), and comparing the output to a desired set of target values. If the training data is labeled, the desired target values may be, e.g., the ground truth labels of the training data. If the training data is unlabeled, the desired target value may be a reconstructed (or otherwise processed) version of the corresponding ML model input (e.g., in the case of an autoencoder), or can be a measure of some target observable effect on the environment (e.g., in the case of a reinforcement learning agent). The parameters of the ML model are updated based on a difference between the generated output value and the desired target value. For example, if the value outputted by the ML model is excessively high, the parameters may be adjusted so as to lower the output value in future training iterations. An objective function is a way to quantitatively represent how close the output value is to the target value. An objective function represents a quantity (or one or more quantities) to be optimized (e.g., minimize a loss or maximize a reward) in order to bring the output value as close to the target value as possible. The goal of training the ML model typically is to minimize a loss function or maximize a reward function.

The training data can be a subset of a larger data set. For example, a data set may be split into three mutually exclusive subsets: a training set, a validation (or cross-validation) set, and a testing set. The three subsets of data may be used sequentially during ML model training. For example, the training set may be first used to train one or more ML models, each ML model, e.g., having a particular architecture, having a particular training procedure, being describable by a set of model hyperparameters, and/or otherwise being varied from the other of the one or more ML models. The validation (or cross-validation) set may then be used as input data into the trained ML models to, e.g., measure the performance of the trained ML models and/or compare performance between them. Where hyperparameters are used, a new set of hyperparameters can be determined based on the measured performance of one or more of the trained ML models, and the first step of training (e.g., with the training set) may begin again on a different ML model described by the new set of determined hyperparameters. In this way, these steps can be repeated to produce a more performant trained ML model. Once such a trained ML model is obtained (e.g., after the hyperparameters have been adjusted to achieve a desired level of performance), a third step of collecting the output generated by the trained ML model applied to the third subset (the testing set) may begin.

The output generated from the testing set may be compared with the corresponding desired target values to give a final assessment of the trained ML model's accuracy. Other segmentations of the larger data set and/or schemes for using the segments for training one or more ML models are possible.

Backpropagation is an algorithm for training an ML model. Backpropagation is used to adjust (e.g., update) the value of the parameters in the ML model, with the goal of optimizing the objective function. For example, a defined loss function is calculated by forward propagation of an input to obtain an output of the ML model and a comparison of the output value with the target value. Backpropagation calculates a gradient of the loss function with respect to the parameters of the ML model, and a gradient algorithm (e.g., gradient descent) is used to update (e.g., "learn") the parameters to reduce the loss function. Backpropagation is performed iteratively so that the loss function is converged or minimized. Other techniques for learning the parameters of the ML model can be used. The process of updating (or learning) the parameters over many iterations is referred to as training. Training may be carried out iteratively until a convergence condition is met (e.g., a predefined maximum number of iterations has been performed, or the value outputted by the ML model is sufficiently converged with the desired target value), after which the ML model is considered to be sufficiently trained. The values of the learned parameters can then be fixed and the ML model may be deployed to generate output in real-world applications (also referred to as "inference").

In some examples, a trained ML model may be fine-tuned, meaning that the values of the learned parameters may be adjusted slightly in order for the ML model to better model a specific task. Fine-tuning of an ML model typically involves further training the ML model on a number of data samples (which may be smaller in number/cardinality than those used to train the model initially) that closely target the specific task. For example, an ML model for generating natural language that has been trained generically on publicly available text corpora may be, e.g., fine-tuned by further training using specific training samples. The specific training samples can be used to generate language in a certain style or in a certain format. For example, the ML model can be trained to generate a blog post having a particular style and structure with a given topic.

Some concepts in ML-based language models are now discussed. It may be noted that, while the term "language model" has been commonly used to refer to an ML-based language model, there could exist non-ML language models. In the present disclosure, the term "language model" can refer to an ML-based language model (e.g., a language model that is implemented using a neural network or other ML architecture), unless stated otherwise. For example, unless stated otherwise, the "language model" encompasses large language models (LLMs).

A language model can use a neural network (typically a DNN) to perform natural language processing (NLP) tasks. A language model can be trained to model how words relate to each other in a textual sequence, based on probabilities. A language model may contain hundreds of thousands of learned parameters or, in the case of an LLM, can contain millions or billions of learned parameters or more. As non-limiting examples, a language model can generate text, translate text, summarize text, answer questions, write code (e.g., Python, JavaScript, or other programming languages), classify text (e.g., to identify spam emails), create content for various purposes (e.g., social media content, factual content, or marketing content), or create personalized content for a particular individual or group of individuals. Language models can also be used for chatbots (e.g., virtual assistance).

A type of neural network architecture, referred to as a "transformer," can be used for language models. For example, the Bidirectional Encoder Representations from Transformers (BERT) model, the Transformer-XL model, and the Generative Pre-trained Transformer (GPT) models are types of transformers. A transformer is a type of neural network architecture that uses self-attention mechanisms in order to generate predicted output based on input data that has some sequential meaning (i.e., the order of the input data is meaningful, which is the case for most text input). Although transformer-based language models are described herein, it should be understood that the present disclosure may be applicable to any ML-based language model, including language models based on other neural network architectures such as RNN-based language models.

Figure 2:
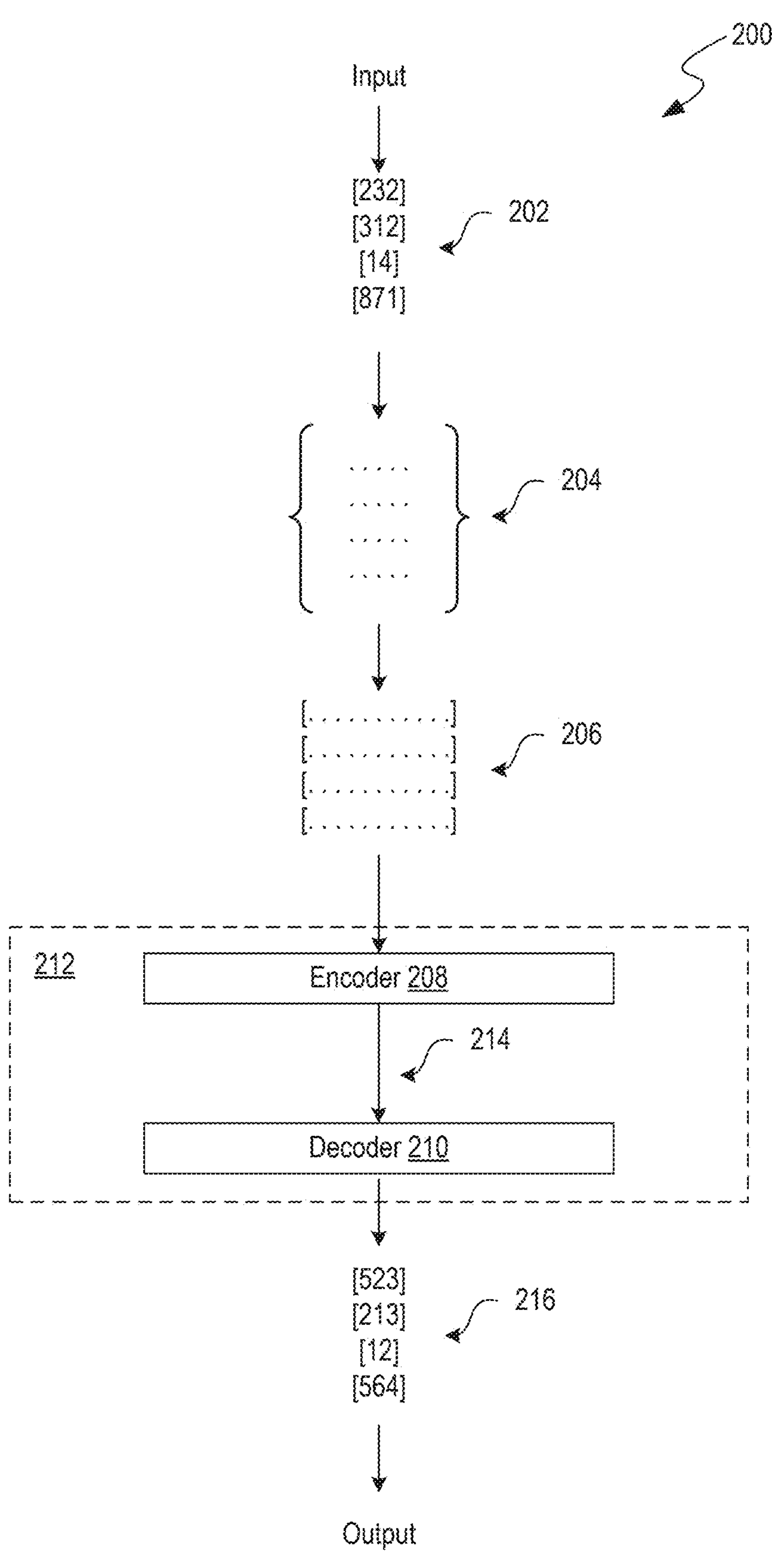
FIG. 2 is a block diagram of a transformer neural network, which may be used in examples of the present disclosure.

FIG. 2 is a block diagram 200 of an example transformer 212. A transformer is a type of neural network architecture that uses self-attention mechanisms to generate predicted output based on input data that has some sequential meaning (e.g., the order of the input data is meaningful, which is the case for most text input). Self-attention is a mechanism that relates different positions of a single sequence to compute a representation of the same sequence. Although transformer-based language models are described herein, the present disclosure may be applicable to any ML-based language model, including language models based on other neural network architectures such as RNN-based language models.

The transformer 212 includes an encoder 208 (which can include one or more encoder layers/blocks connected in series) and a decoder 210 (which can include one or more decoder layers/blocks connected in series). Generally, the encoder 208 and the decoder 210 each include multiple neural network layers, at least one of which can be a self-attention layer. The parameters of the neural network layers can be referred to as the parameters of the language model.

The transformer 212 can be trained to perform certain functions on a natural language input. Examples of the functions include summarizing existing content, brainstorming ideas, writing a rough draft, fixing spelling and grammar, and translating content. Summarizing can include extracting key points or themes from an existing content in a high-level summary. Brainstorming ideas can include generating a list of ideas based on provided input. For example, the ML model can generate a list of names for a startup or costumes for an upcoming party. Writing a rough draft can include generating writing in a particular style that could be useful as a starting point for the user's writing. The style can be identified as, e.g., an email, a blog post, a social media post, or a poem. Fixing spelling and grammar can include correcting errors in an existing input text. Translating can include converting an existing input text into a variety of different languages. In some implementations, the transformer 212 is trained to perform certain functions on other input formats than natural language input. For example, the input can include objects, images, audio content, or video content, or a combination thereof.

The transformer 212 can be trained on a text corpus that is labeled (e.g., annotated to indicate verbs, nouns) or unlabeled. LLMs can be trained on a large unlabeled corpus. The term "language model," as used herein, can include an ML-based language model (e.g., a language model that is implemented using a neural network or other ML architecture), unless stated otherwise. Some LLMs can be trained on a large multi-language, multi-domain corpus to enable the model to be versatile at a variety of language-based tasks such as generative tasks (e.g., generating human-like natural language responses to natural language input).

FIG. 2 illustrates an example of how the transformer 212 can process textual input data. Input to a language model (whether transformer-based or otherwise) typically is in the form of natural language that can be parsed into tokens. The term "token" in the context of language models and NLP has a different meaning from the use of the same term in other contexts such as data security. Tokenization, in the context of language models and NLP, refers to the process of parsing textual input (e.g., a character, a word, a phrase, a sentence, a paragraph) into a sequence of shorter segments that are converted to numerical representations referred to as tokens (or "compute tokens"). Typically, a token can be an integer that corresponds to the index of a text segment (e.g., a word) in a vocabulary dataset. Often, the vocabulary dataset is arranged by frequency of use. Commonly occurring text, such as punctuation, can have a lower vocabulary index in the dataset and thus be represented by a token having a smaller integer value than less commonly occurring text. Tokens frequently correspond to words, with or without white space appended. In some implementations, a token can correspond to a portion of a word.

For example, the word "greater" can be represented by a token for [great] and a second token for [er]. In another example, the text sequence "write a summary" can be parsed into the segments [write], [a], and [summary], each of which can be represented by a respective numerical token. In addition to tokens that are parsed from the textual sequence (e.g., tokens that correspond to words and punctuation), there can also be special tokens to encode non-textual information. For example, a [CLASS] token can be a special token that corresponds to a classification of the textual sequence (e.g., can classify the textual sequence as a list, a paragraph), an [EOT] token can be another special token that indicates the end of the textual sequence, other tokens can provide formatting information, etc.

In FIG. 2, a short sequence of tokens 202 corresponding to the input text is illustrated as input to the transformer 212. Tokenization of the text sequence into the tokens 202 can be performed by some pre-processing tokenization module such as, for example, a byte-pair encoding tokenizer (the "pre" referring to the tokenization occurring prior to the processing of the tokenized input by the LLM), which is not shown in FIG. 2 for brevity. In general, the token sequence that is inputted to the transformer 212 can be of any length up to a maximum length defined based on the dimensions of the transformer 212. Each token 202 in the token sequence is converted into an embedding vector 206 (also referred to as "embedding 206").

An embedding 206 is a learned numerical representation (such as, for example, a vector) of a token that captures some semantic meaning of the text segment represented by the token 202. The embedding 206 represents the text segment corresponding to the token 202 in a way such that embeddings corresponding to semantically related text are closer to each other in a vector space than embeddings corresponding to semantically unrelated text. For example, assuming that the words "write," "a," and "summary" each correspond to, respectively, a "write" token, an "a" token, and a "summary" token when tokenized, the embedding 206 corresponding to the "write" token will be closer to another embedding corresponding to the "jot down" token in the vector space as compared to the distance between the embedding 206 corresponding to the "write" token and another embedding corresponding to the "summary" token.

The vector space can be defined by the dimensions and values of the embedding vectors. Various techniques can be used to convert a token 202 to an embedding 206. For example, another trained ML model can be used to convert the token 202 into an embedding 206. In particular, another trained ML model can be used to convert the token 202 into an embedding 206 in a way that encodes additional information into the embedding 206 (e.g., a trained ML model can encode positional information about the position of the token 202 in the text sequence into the embedding 206). In some implementations, the numerical value of the token 202 can be used to look up the corresponding embedding in an embedding matrix 204, which can be learned during training of the transformer 212.

The generated embeddings 206 are input into the encoder 208. The encoder 208 serves to encode the embeddings 206 into feature vectors 214 that represent the latent features of the embeddings 206. The encoder 208 can encode positional information (i.e., information about the sequence of the input) in the feature vectors 214. The feature vectors 214 can have very high dimensionality (e.g., on the order of thousands or tens of thousands), with each element in a feature vector 214 corresponding to a respective feature. The numerical weight of each element in a feature vector 214 represents the importance of the corresponding feature. The space of all possible feature vectors 214 that can be generated by the encoder 208 can be referred to as a latent space or feature space.

Conceptually, the decoder 210 is designed to map the features represented by the feature vectors 214 into meaningful output, which can depend on the task that was assigned to the transformer 212. For example, if the transformer 212 is used for a translation task, the decoder 210 can map the feature vectors 214 into text output in a target language different from the language of the original tokens 202. Generally, in a generative language model, the decoder 210 serves to decode the feature vectors 214 into a sequence of tokens. The decoder 210 can generate output tokens 216 one by one. Each output token 216 can be fed back as input to the decoder 210 in order to generate the next output token 216. By feeding back the generated output and applying self-attention, the decoder 210 can generate a sequence of output tokens 216 that has sequential meaning (e.g., the resulting output text sequence is understandable as a sentence and obeys grammatical rules). The decoder 210 can generate output tokens 216 until a special [EOT] token (indicating the end of the text) is generated. The resulting sequence of output tokens 216 can then be converted to a text sequence in post-processing. For example, each output token 216 can be an integer number that corresponds to a vocabulary index. By looking up the text segment using the vocabulary index, the text segment corresponding to each output token 216 can be retrieved, the text segments can be concatenated together, and the final output text sequence can be obtained.

In some implementations, the input provided to the transformer 212 includes instructions to perform a function on an existing text. The output can include, for example, a modified version of the input text and instructions to modify the text. The modification can include summarizing, translating, correcting grammar or spelling, changing the style of the input text, lengthening or shortening the text, or changing the format of the text (e.g., adding bullet points or checkboxes). As an example, the input text can include meeting notes prepared by a user and the output can include a high-level summary of the meeting notes. In other examples, the input provided to the transformer includes a question or a request to generate text. The output can include a response to the question, text associated with the request, or a list of ideas associated with the request. For example, the input can include the question "What is the weather like in San Francisco?" and the output can include a description of the weather in San Francisco. As another example, the input can include a request to brainstorm names for a flower shop and the output can include a list of relevant names.

Although a general transformer architecture for a language model and its theory of operation have been described above, this is not intended to be limiting. Existing language models include language models that are based only on the encoder of the transformer or only on the decoder of the transformer. An encoder-only language model encodes the input text sequence into feature vectors that can then be further processed by a task-specific layer (e.g., a classification layer). BERT is an example of a language model that can be considered to be an encoder-only language model. A decoder-only language model accepts embeddings as input and can use auto-regression to generate an output text sequence. Transformer-XL and GPT-type models can be language models that are considered to be decoder-only language models.

Because GPT-type language models tend to have a large number of parameters, these language models can be considered LLMs. An example of a GPT-type LLM is GPT-3. GPT-3 is a type of GPT language model that has been trained (in an unsupervised manner) on a large corpus derived from documents available online to the public. GPT-3 has a very large number of learned parameters (on the order of hundreds of billions), can accept a large number of tokens as input (e.g., up to 2,048 input tokens), and is able to generate a large number of tokens as output (e.g., up to 2,048 tokens). GPT-3 has been trained as a generative model, meaning that it can process input text sequences to predictively generate a meaningful output text sequence. ChatGPT is built on top of a GPT-type LLM and has been fine-tuned with training datasets based on text-based chats (e.g., chatbot conversations). ChatGPT is designed for processing natural language, receiving chat-like inputs, and generating chat-like outputs.

A computer system can access a remote language model (e.g., a cloud-based language model), such as ChatGPT or GPT-3, via a software interface (e.g., an API). Additionally or alternatively, such a remote language model can be accessed via a network such as the Internet. In some implementations, such as, for example, potentially in the case of a cloud-based language model, a remote language model can be hosted by a computer system that can include multiple cooperating (e.g., cooperating via a network) computer systems that can be in, for example, a distributed arrangement. Notably, a remote language model can employ multiple processors (e.g., hardware processors such as, for example, processors of cooperating computer systems). Indeed, processing of inputs by an LLM can be computationally expensive/can involve a large number of operations (e.g., many instructions can be executed/large data structures can be accessed from memory), and providing output in a required timeframe (e.g., real time or near real time) can require the use of multiple processors/cooperating computing devices as discussed above.

Inputs to an LLM can be referred to as a prompt, which is a natural language input that includes instructions to the LLM to generate a desired output. A computer system can generate a prompt that is provided as input to the LLM via an API (e.g., the API 128 in FIG. 1). As described above, the prompt can optionally be processed or pre-processed into a token sequence prior to being provided as input to the LLM via its API. A prompt can include one or more examples of the desired output, which provides the LLM with additional information to enable the LLM to generate output according to the desired output. Additionally or alternatively, the examples included in a prompt can provide inputs (e.g., example inputs) corresponding to/as can be expected to result in the desired outputs provided. A one-shot prompt refers to a prompt that includes one example, and a few-shot prompt refers to a prompt that includes multiple examples. A prompt that includes no examples can be referred to as a zero-shot prompt.

Hierarchical Organizational Blocks in a Workspace

Figure 3:
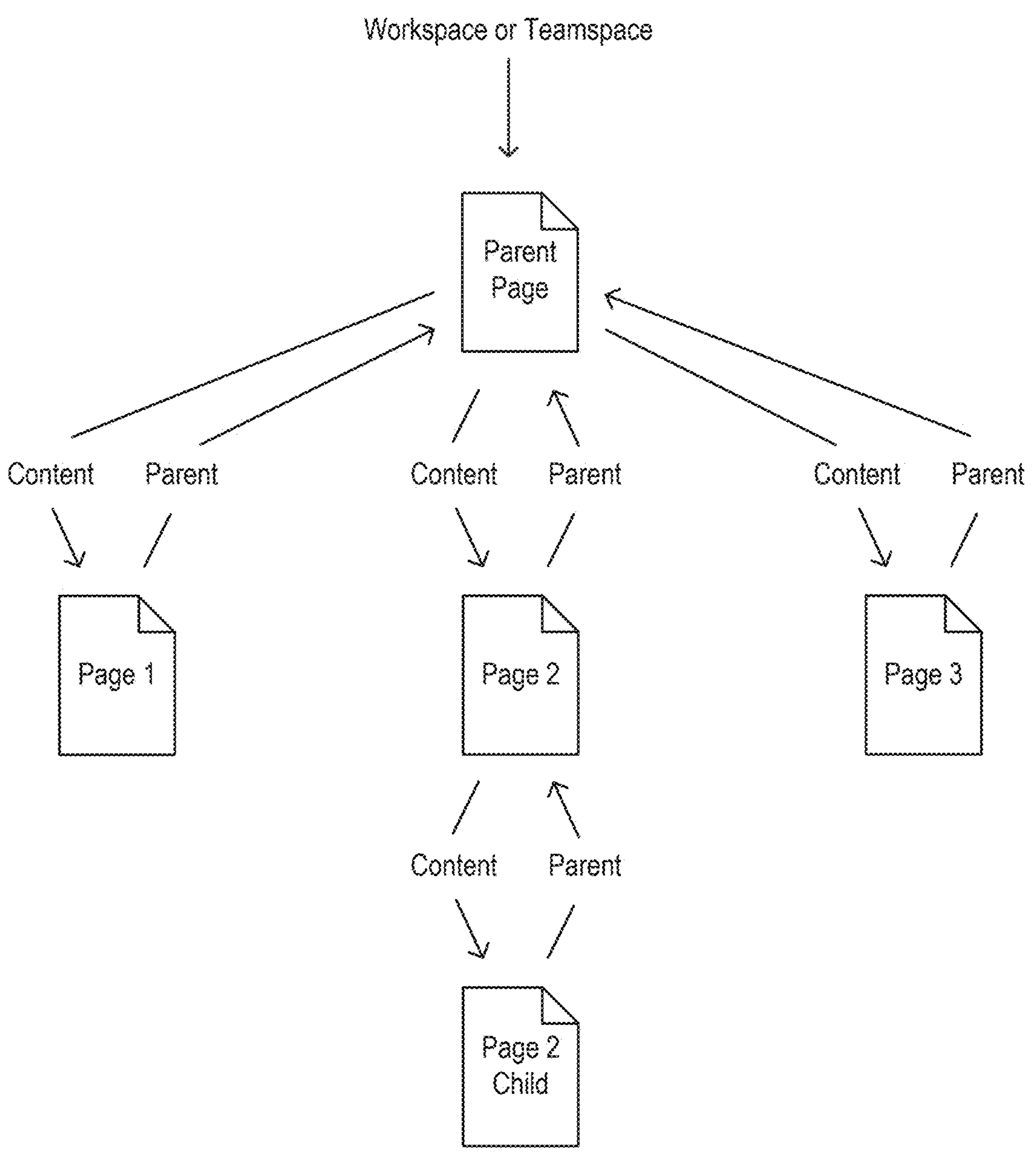
FIG. 3 is a block diagram illustrating a hierarchical organization of pages in a workspace.

FIG. 3 is a block diagram illustrating a hierarchical organization of pages in a workspace. As described with respect to the block data model of the present technology, a workspace can include multiple pages (e.g., page blocks). The pages (e.g., including parent pages and child or nested pages) can be arranged hierarchically within the workspace or one or more teamspaces, as shown in FIG. 3. The page can include a block such as tabs, lists, images, tables, etc.

A teamspace can refer to a collaborative space associated with a team or an organization that is hierarchically below a workspace. For example, a workspace can include a teamspace accessible by all users of an organization and multiple teamspaces that are accessible by users of different teams. Accessibility generally refers to creating, editing, and/or viewing content (e.g., pages) included in the workspace or the one or more teamspaces.

In the hierarchical organization illustrated in FIG. 3, a parent page (e.g., "Parent Page") is located hierarchically below the workspace or a teamspace. The parent page includes three children pages (e.g., "Page 1," "Page 2," and "Page 3"). Each of the child pages can further include subpages (e.g., "Page 2 Child," which is a grandchild of "Parent Page" and child of "Page 2"). The "Content" arrows in FIG. 3 indicate the relationship between the parents and children while the "Parent" arrows indicate the inheritance of access permissions. The child pages inherit access permission from the (immediate) parent page under which they are located hierarchically (e.g., which is above them in the tree). For example, "Page 2" inherited the access permission of the "Parent Page" as a default when it was created under its parent page. Similarly, "Page 2 Child" inherited the access permission of the parent page as a default when it was created under its parent page. "Parent Page," "Page 2," and "Page 2 Child" thereby have the same access permission within the workspace.

The relationships and organization of the content can be modified by changing the location of the pages. For example, when a child page is moved to be under a different parent, the child page's access permission modifies to correspond to the access permission of the new parent. Also, when the access permission of "Parent Page" is modified, the access permission of "Page 1," "Page 2," and "Page 3" can be automatically modified to correspond to the access permission of "Parent Page" based on the inheritance character of access permissions.

In contrast, however, a user can modify the access permission of the children independently of their parents. For example, the user can modify the access permission of "Page 2 Child" in FIG. 3 so that it is different from the access permission of "Page 2" and "Parent Page." The access permission of "Page 2 Child" can be modified to be broader or narrower than the access permission of its parents. As an example, "Page 2 Child" can be shared on the internet while "Page 2" is only shared internally to the users associated with the workspace. As another example, "Page 2 Child" can be shared only with an individual user while "Page 2" is shared with a group of users (e.g., a team of the organization associated with the workspace). In some implementations, the hierarchical inheritance of the access permissions described herein can be modified from the previous description. For example, the access permissions of all the pages (parent and children) can be defined as independently changeable.

Database Container

Figure 4:
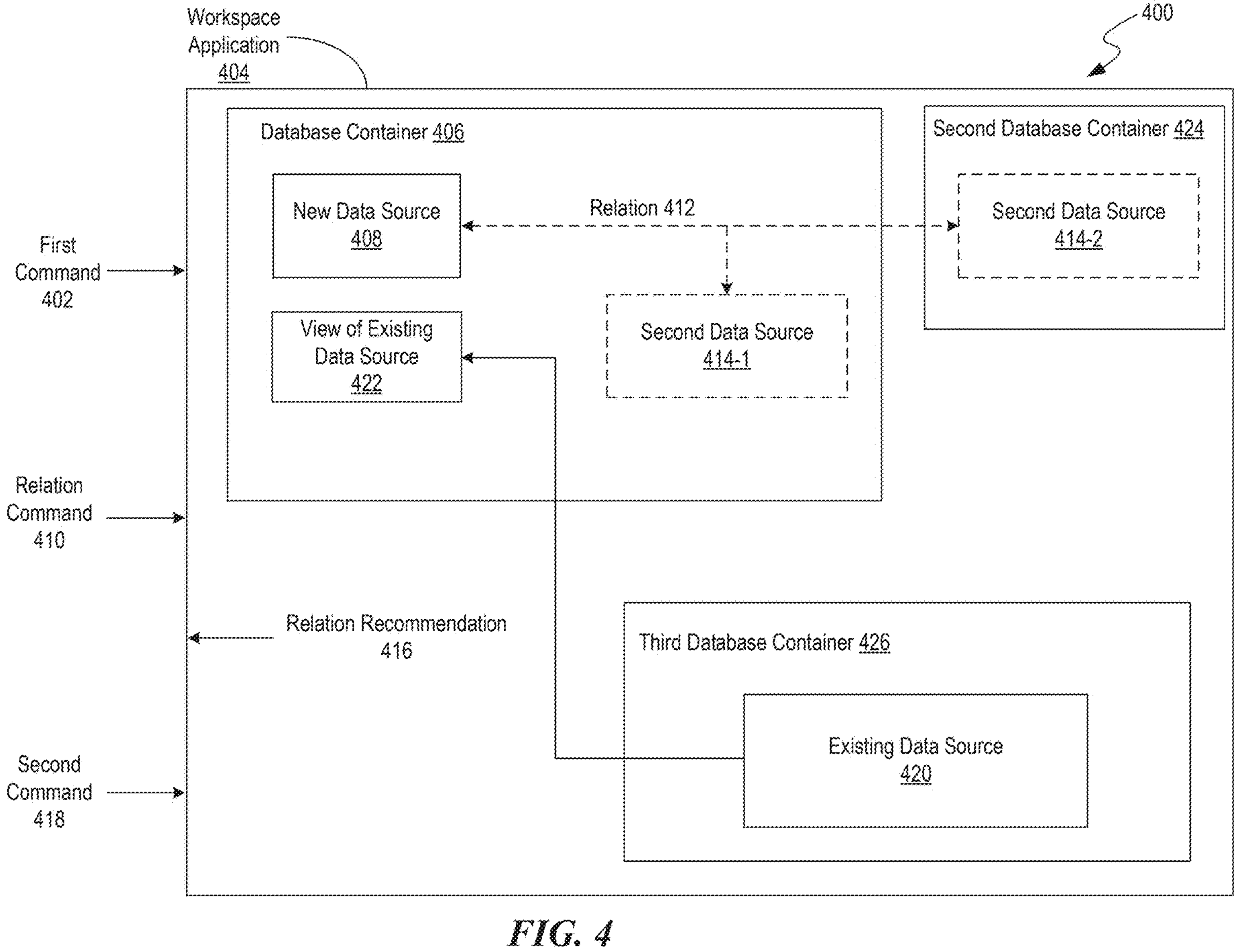
FIG. 4 illustrates an example workspace environment including a database container configured to contain multiple data sources.

FIG. 4 illustrates an example workspace environment 400 including a database container 406 configured to contain multiple data sources. The workspace environment 400 includes a workspace application 404 that includes a database container 406, an optional second data source 414-2, an existing data source 420, a second database container 424, and a third database container 426. The database container 406 includes a new data source 408, a relation 412, an optional second data source 414-1, and a view 422 of the existing data source. The workspace application 404 is configured to receive a first command 402, a relation command 410, and a second command 418. Further, the workspace application 404 is configured to provide, as output, a relation recommendation 416. The optional second data sources 414-1 and 414-2 are collectively referred to as "data sources 414" and individually as "data source 414." The workspace environment 400 can be implemented using components of the example computer system illustrated and described in more detail with reference to FIG. 13 below. The workspace environment 400 can include additional and/or different components, and the components may be organized and/or connected in different or additional ways from those shown in FIG. 4.

In some embodiments, a first command 402 is received by the workspace application 404 to add the new data source 408 to the database container 406 of the workspace application 404. The workspace application 404 is an application or other software component providing a suite of tools for data and/or project management (e.g., Notion®). The database container can be configured to contain multiple data sources. Data sources can be alternatively referred to herein as databases. In some embodiments, the first command 402 is a first request received by the workspace application 404. A command (e.g., first command 402) can be a direct instruction to perform an action or set of actions immediately. Typically, a command is imperative, concise, and instructs an application (e.g., workspace application 404) without room for interpretation. Alternatively, a request can imply a need for permission to perform an action or set of actions and/or require a response or more context before performing the action. For example, by receiving a request rather than a command, the workspace application 404 may need to check permissions and/or can require further clarification or validation before performing an action or set of actions. For example, the workspace application 404 may require confirmation from a user before creating the new data source 408 in response to the request, whereas the workspace application 404 can create the new data source 408 without confirmation in response to receiving the first command 402.

In response to the first command 402 being received, the new data source 408 can be created within the database container 406. The first command 402 can be received via, for example, a user input and/or automated processes of the workspace application 404. By creating the new data source 408 within the database container 406, the new data source 408 is contained within the database container. In some embodiments, containing the new data source 408, or any data source of the workspace application, within the database container 406 causes the database container 406 to act as a parent to the new data source 408 such that the new data source 408 inherits properties of the database container 406 including a first set of access permissions. The first set of access permissions can include permissions that govern how a user, or other components of the workspace application 404, such as an AI agent, interacts with the workspace application 404 to, for example, view, comment on, edit content within, or edit the structure of blocks, discussed in relation to FIG. 1, within the workspace application 404, including pages, workspaces, databases, or any other data representation within the workspace application 404.

Data sources that are contained within a database container of the workspace application 404 exist and/or reside within the database container. The database container can act as a hierarchical owner of the data sources that reside within the database container. For example, a data source contained within the database container can act as a subordinate element of the database container that is managed, controlled, and/or otherwise governed by the database container.

In some embodiments, the new data source 408 is caused to be displayed via the database container 406. Examples of the new data source 408 being displayed via the database container 406 are provided below. In some embodiments, a command to create a relation 412 (e.g., relation command 410) between the new data source 408 and a second data source 414 of the workspace application 404 is received. In some embodiments, the second data source 414 is contained within the database container 406 (e.g., the second data source 414-1). Alternatively, the second data source 414 can be located outside of the database container 406 but within a different database container of the workspace application 404 (e.g., when the second data source 414 is the second data source 414-2). In some embodiments, the second data source 414-2 is contained within a second database container 424 of the workspace application 404. The second data source 414-2 can alternatively be contained within a third database container 426, or any other database container of the workspace application other than the database container 406.

Figure 11A:
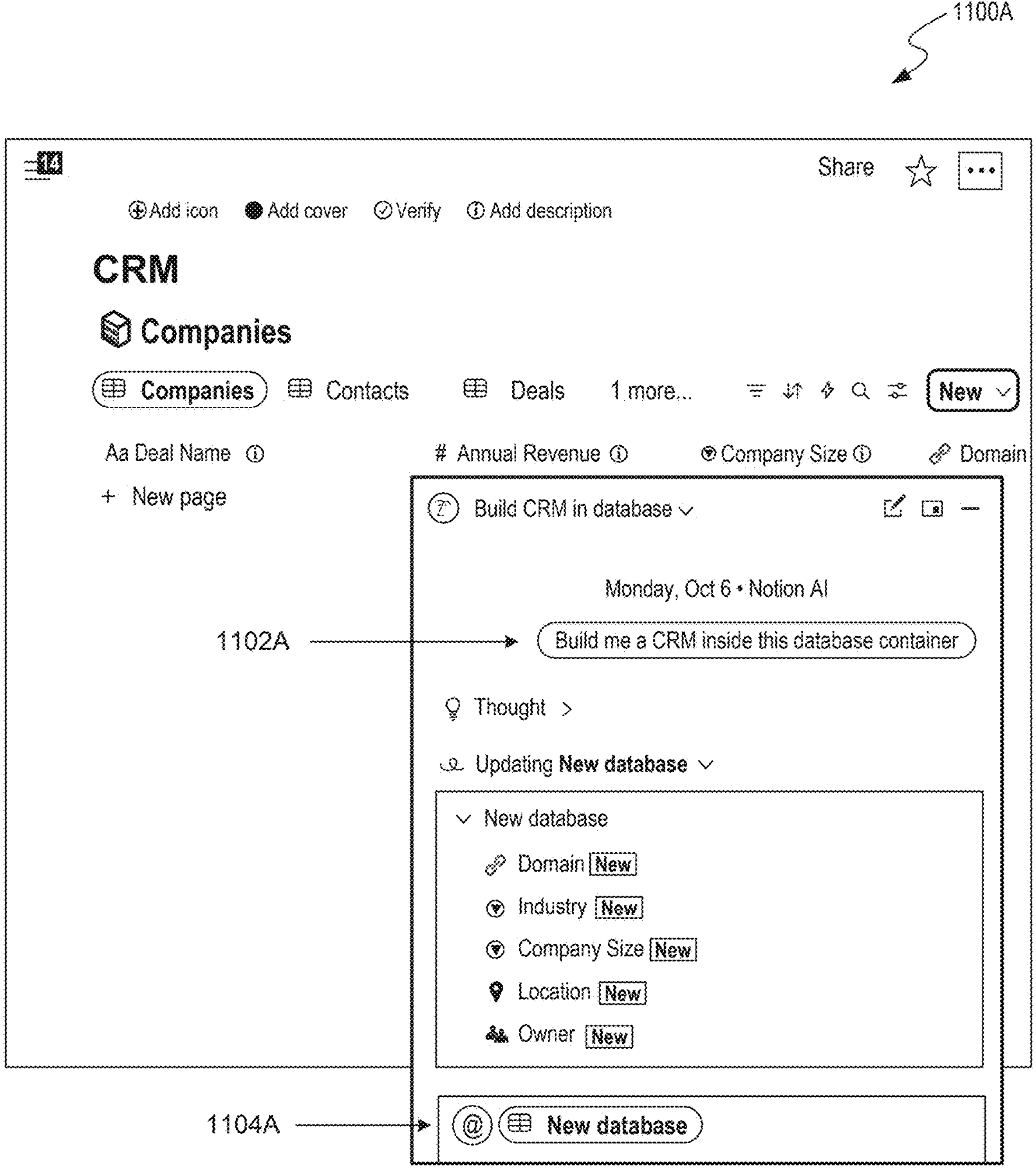
FIG. 11A illustrates an example interface for creating a database container in response to a command received by an artificial intelligence (AI) agent of a workspace application.
Figure 11B:
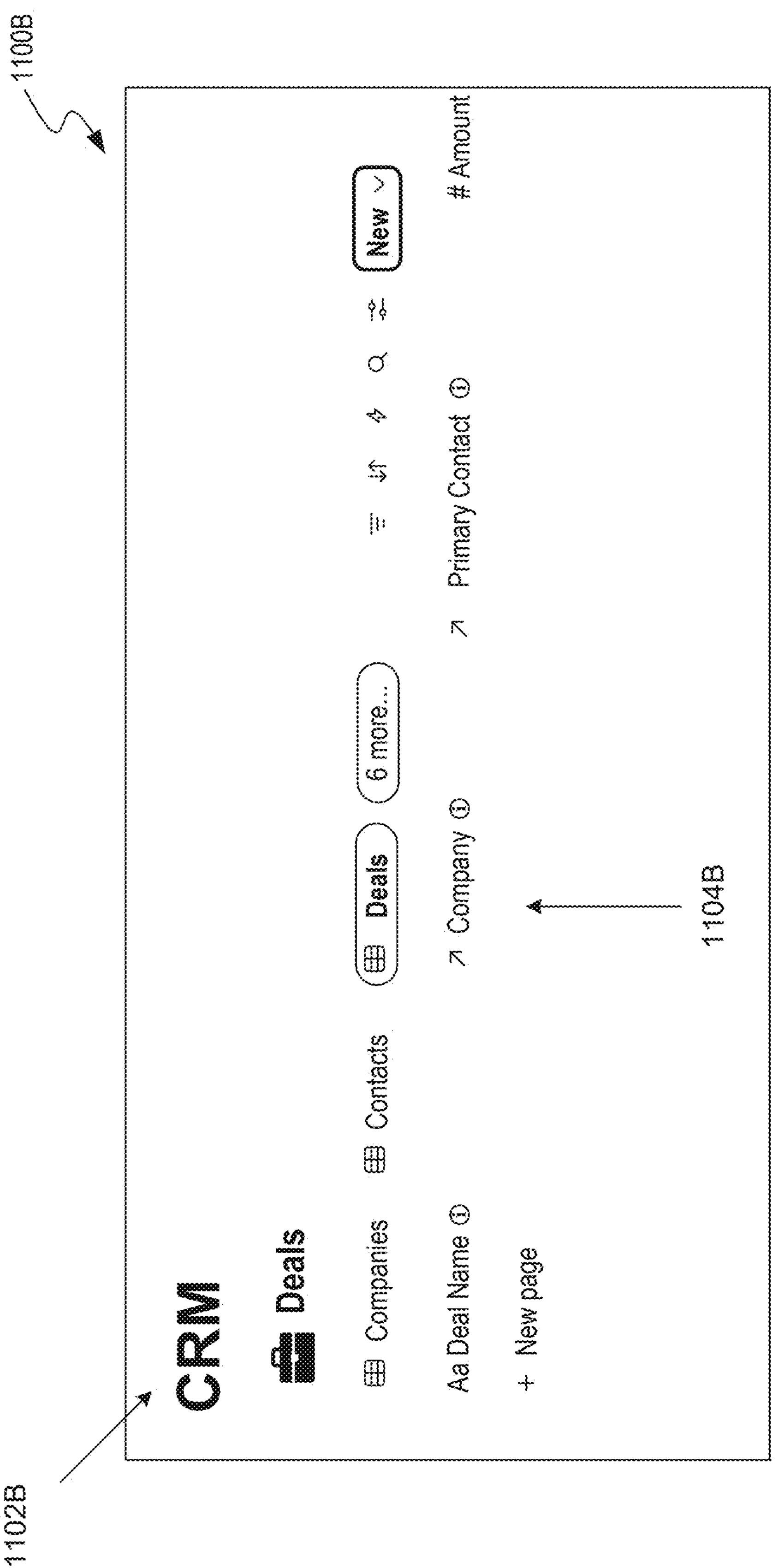
FIG. 11B illustrates an example interface of a database container created by the AI agent.

The workspace application 404 can generate a recommendation (e.g., relation recommendation 416) to create the relation between the new data source 408 and one or more data sources contained within the database container 406. In such embodiments, the one or more data sources contained within the database container 406 includes the second data source 414-1. The one or more data sources contained within the database container can be related in terms of the content and/or data included within each data source (e.g., a customer relations management, or CRM, database container containing data sources, each related to a CRM parameter, as shown in FIGS. 11A and 11B below). By creating the relation recommendation 416, the workspace application 404 can provide a prompt and/or encouragement to create the relation 412 with one or more data sources having a relevant and/or contextual connection. The relation recommendation 416 can improve performance of the workspace application 404 by improving an ease of connecting relevant data (e.g., for users of the workspace application 404). The workspace application 404 can display the relation recommendation 416 as output. In some embodiments, the relation recommendation is displayed via a user interface of a device (e.g., a computer, a smartphone, and/or another device) hosting the workspace application 404. Additionally or alternatively, a selection of the second data source 414 can be received. The selection of the second data source 414 can be received via, for example, a user input via a user interface of a device hosting the workspace application 404. In response to receiving the command (e.g., relation command 410) to create the relation 412, the relation 412 is created between the new data source 408 and the second data source 414. In some embodiments, creating the relation between the new data source 408 and the second data source 414 causes display of the second data source 414 within a relation column of the new data source 408.

In some embodiments, the relation command 410 is a command to create a two-way relation between the new data source 408 and the second data source 414. In response to receiving the command to create the two-way relation, the workspace application 404 creates the two-way relation between the new data source 408 and the second data source 414 (e.g., second data source 414-1 or second data source 414-2). In some embodiments, the second data source 414 is displayed within a relation column of the new data source 408. Further, the new data source 408 can be displayed within a relation column of the second data source 414. A two-way relation between two data sources allows for reciprocal connections between the two data sources. Creating the two-way relation allows, for example, changes in one data source to be automatically reflected in the other data source connected via the two-way relation. Further examples of a relation 412 and a two-way relation are described in the discussion of FIGS. 11A and 11B below.

In some embodiments, a second command 418 is received by the workspace application 404. The second command 418 can be a command to link an existing data source 420 of the workspace application 404 to the database container 406. The existing data source 420 resides outside of the database container 406 but within a different database container of the workspace application 404. For example, the existing data source 420 can be contained within a third database container 426 of the workspace application 404. In some embodiments, the existing data source 420 resides within the workspace application 404 but is not contained within either the database container 406 or the third database container 426. In such embodiments, the existing data source 420 can be contained within the second database container 424 of the workspace application. Alternatively, the existing data source can be contained within a database container of the workspace application other than the database container 406, the second database container 424, or the third database container 426.

In response to the second command 418 being received, a view 422 of the existing data source 420 can be created within the database container 406. The view 422 is created without the existing data source 420 being contained within the database container 406. Instead, the existing data source 420 continues to reside in the same location within the workspace application 404 as before the view 422 of the existing data source 420 is created. In some embodiments, the existing data source 420 retains a second set of access permissions. The second set of access permissions can be different from the first set of access permissions associated with the database container 406 and/or the one or more data sources contained within the database container 406.

Example Interfaces

Figure 5:
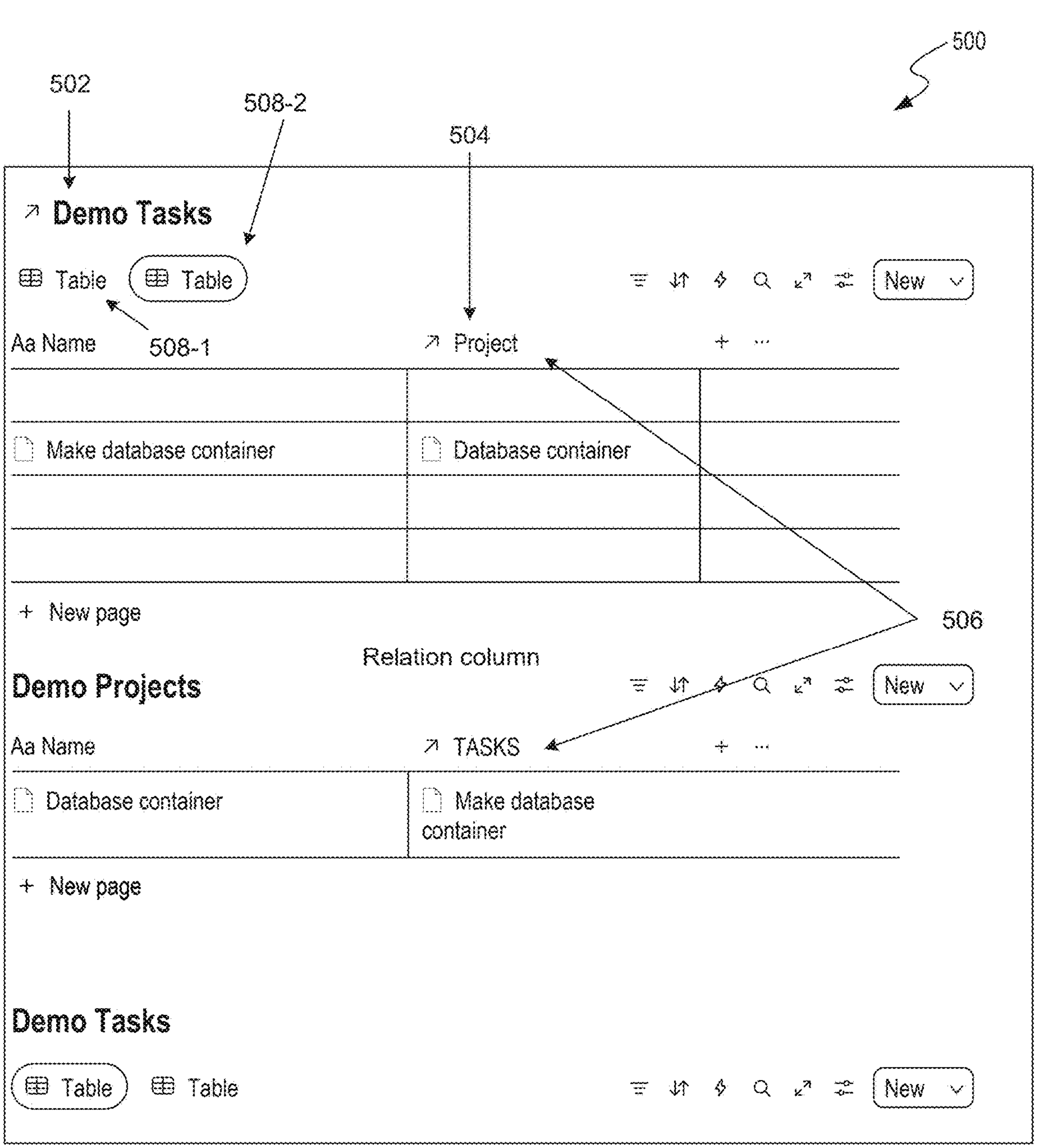
FIG. 5 illustrates an interface of a workspace application without a database container.

FIG. 5 illustrates an example interface 500 of a workspace application in which multiple data sources are not contained within a database container. The workspace application may be the same as or similar to the workspace application 404 as described in relation to FIG. 4 above. The interface 500 provides a page including multiple views, each view displaying a data source as a separate, independent entity rather than organizing the data sources within a database container. The page includes a view 502 of a "Demo Tasks" data source. As shown in the example of FIG. 5, two data sources of the workspace application include the data source labeled "Demo Tasks" and a data source labeled "Demo Projects." The view 502 of the "Demo Tasks" data source is shown at the top of the interface 500, above the "Demo Projects" and "Demo Tasks" data sources. Within the view 502 of the "Demo Tasks" data source, a first view 508-1 and a second view 508-2 provide independent representations of the "Demo Tasks" data source. In some embodiments, the first view 508-1 and the second view 508-2 are different, for example, by filtering the data of the "Demo Tasks" data source in different ways. However, multiple data sources cannot be viewed, edited, or contained within a hierarchical parent structure in the workspace application without the use of a database container.

In the continued example of FIG. 5, within the view 502 of the "Demo Tasks" data source, a relation column 504 includes a relation between the "Demo Tasks" data source and the "Demo Projects" data source. In some embodiments, the relation is a two-way relation 506. The two-way relation 506 may be the same as or similar to the two-way relation as described in the discussion of FIG. 4 above. A two-way relation can establish a bidirectional connection between two data sources of the workspace application, where each data source automatically maintains a relation column (e.g., relation column 504) that references the relation column 504 of the other data source involved in the two-way relation. When the two-way relation is created between the two data sources, and, for example, an entry in the first data source is edited, a corresponding entry in the relation column 504 of the second data source can automatically reflect the edit.

The use of a two-way relation can limit the need for users of the workspace application to manually maintain relationships between multiple data sources from both perspectives. However, without the use of a database container, the creation of a two-way relation alone does not solve the problems of distributed data management. Each data source involved in the two-way relation can continue to maintain independent properties such as access permissions, organizational settings, and administrative controls. Data sources must be managed individually, which can lead to inconsistencies across related data sources. Further, when performing operations on the data contained within each data source, or performing operations on the data source itself, there is no centralized interface for managing the data sources, limiting data interconnectedness and ability to streamline workflows within the workspace application.

Figure 6:
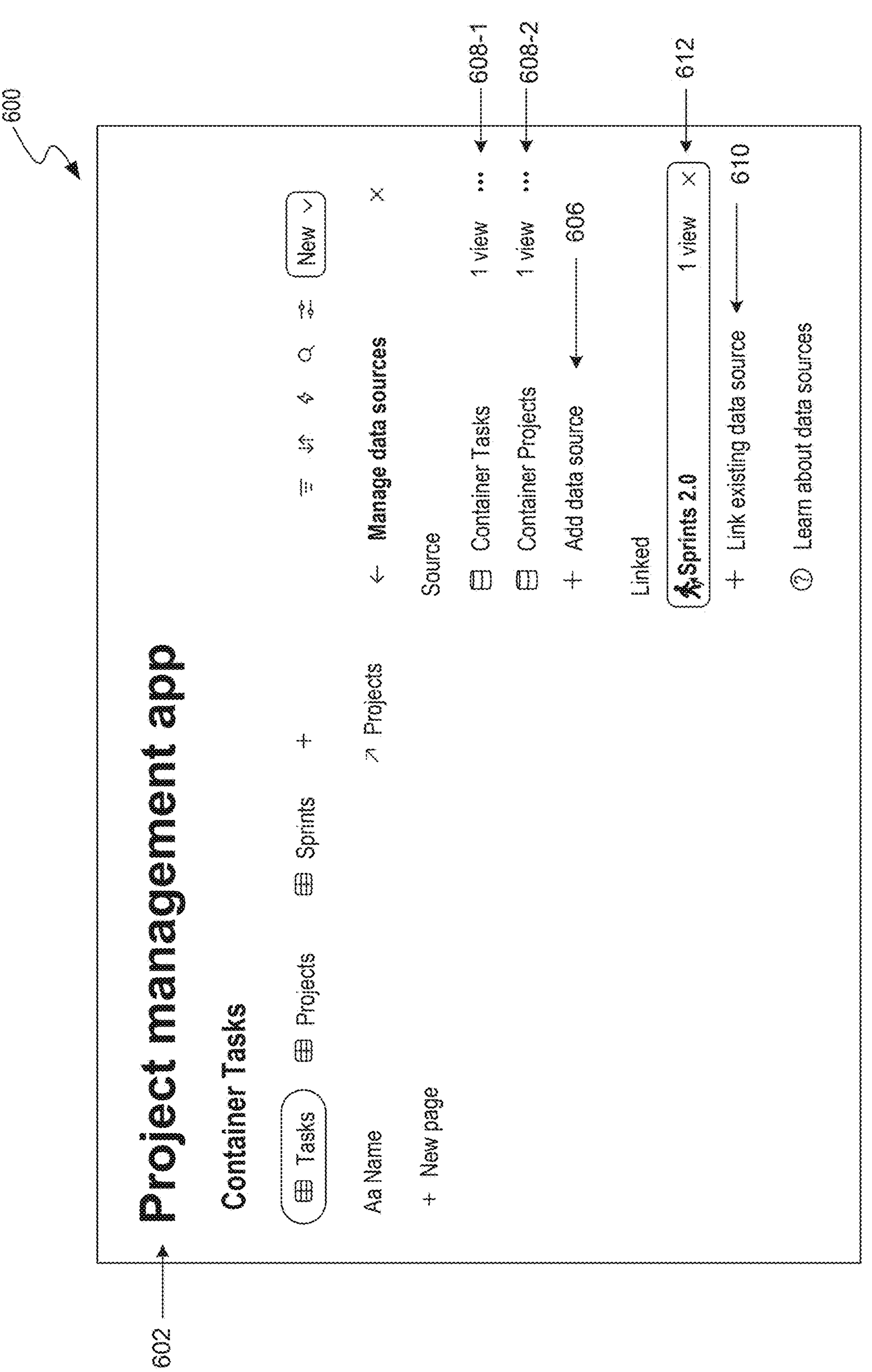
FIG. 6 illustrates an interface for management of data sources contained within a database container and data sources linked to the database container.

FIG. 6 illustrates an example interface 600 of a database container 602 with contained data sources 608 and a linked data source 612 within a workspace application. The workspace application and the database container 602 may be the same as or similar to the workspace application 404 and the database container 406 as described in relation to FIG. 4 above, respectively.

In the example interface 600 of the workspace application shown in FIG. 6, a first command selector 606 is provided. Upon selection of the first command selector 606, the workspace application receives a first command to add a new data source to the database container 602. The first command may be the same as or similar to the first command 402 as described in relation to FIG. 4 above. In some embodiments, in response to receiving the first command, the workspace application creates the new data source, and the new data source is contained within the database container. In the continued example of FIG. 6, the new data source is a first contained data source 608-1 titled "Container Tasks" or a second contained data source 608-2 titled "Container Projects." Within the workspace application, the contained data sources 608 exist and/or reside within the database container 602, which is titled, as shown in FIG. 6, "Project management app."

The workspace application can also include data sources linked to the database container 602 such as linked data source 612, titled "Sprints 2.0." In some embodiments, a second command selector 610 is provided by the workspace application that, when selected, causes the workspace application to receive a second command to link an existing data source of the workspace application to the database container 602. In the example of FIG. 6, the existing data source linked to the database container is "Sprints 2.0," which resides outside of the database container 602 but within the workspace application. As described above, linked data sources are not contained within the database container 602. In response to receiving the second command via, for example, the second command selector 610, the workspace application creates a view of the existing data source within the database container 602 without containing the existing data source within the database container 602. Further, the existing data source can retain a second set of access permissions different from the first set of access permissions. The first and second set of access permissions are discussed further in relation to FIG. 10 below.

The distinction between contained data sources and linked data sources is fundamental to the operation of the database container 602. Contained data sources such as the first contained data source 608-1 and the second contained data source 608-2 can be owned by the database container 602, meaning that the database container 602 acts as the hierarchical parent and governs the access permissions, organizational settings, and administrative controls for the contained data sources. When operations are performed on the database container 602, such as deletion or permission changes, the contained data sources can be affected accordingly due to their ownership relationship with the database container 602.

Linked data sources 612 are fundamentally different from contained data sources 608 within the workspace application. Linked data sources 612 reside within a different database container other than database container 602. Operations performed on the database container 602 may not affect the permissions of or delete the underlying data in the linked data source 612, preserving the independence of the linked data source 612 while providing access via the database container 602. However, by allowing both linked data sources 612 and contained data sources 608 to be displayed via the database container 602, the workspace application provides effective data management, organization, and manipulation of related data sources residing anywhere within the workspace application.

Figure 7:
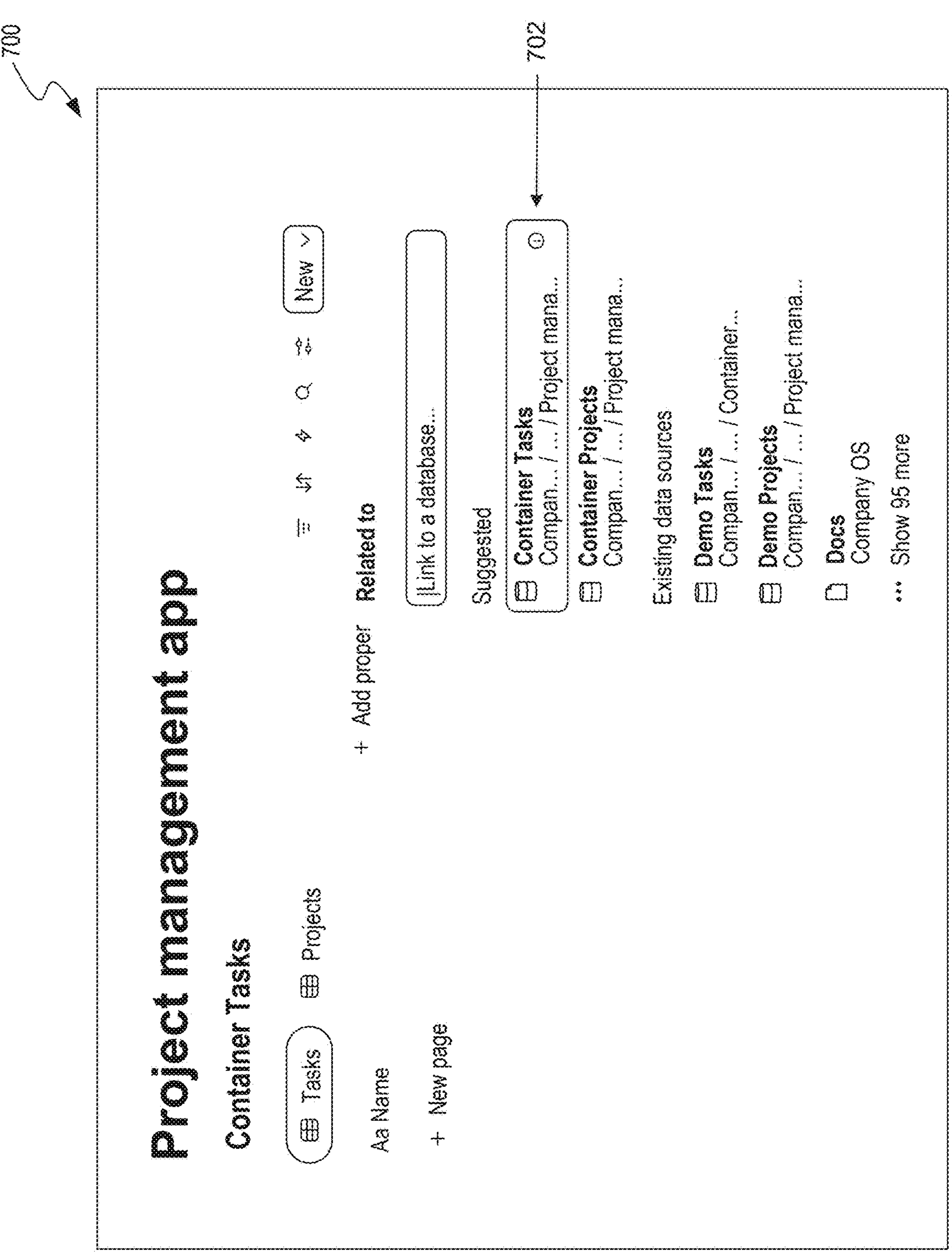
FIG. 7 illustrates an example of a command received at an interface to create a relation between data sources.

FIG. 7 illustrates an example interface 700 of a command to create a relation between data sources and a relation recommendation 702. The relation recommendation 702 of FIG. 7 is an example of the relation recommendation 416 as described in the description of FIG. 4 above. The interface 700 includes a database container containing multiple data sources, including, for example, "Container Tasks" and "Container Projects," which can be contained within the database container. The database container may be the same as or similar to the database container 406 or the database container 602 as described in relation to FIG. 4 and FIG. 6, respectively.

In some embodiments, a command is received to create a relation between two data sources of the workspace application (e.g., the new data source 408 and a second data source 414). The workspace application may be the same as or similar to the workspace application 404 as described in relation to FIG. 4. In such embodiments, a recommendation (e.g., relation recommendation 702) is generated by the workspace application to create the relation between the new data source and one or more data sources contained within the database container. In the example shown in FIG. 7, the relation recommendation 702 is generated to create the relation between the "Container Tasks" data source contained within the database container and the "Container Projects" data source contained within the database container. The relation recommendation 702 can appear in a dropdown menu or interface element of the workspace application that presents suggested data sources for connection. The relation recommendation 702 can recommend relations between data sources that are contained within the same database container. Further, the relation recommendation 702 can act as a prompt to encourage the establishment of connections, via the relation, between data sources that are organizationally grouped together (e.g., contained within the same database container) and/or include related data or pages.

In some embodiments, the relation recommendation 702 is generated based on a contextual analysis of the one or more data sources contained within the database container. The workspace application can examine, for example, data source names, content structures, or usage patterns to identify data sources that are likely to benefit from relational connections. For example, in the context of the "Project management app" database container shown in FIG. 7, the workspace application can generate the relation recommendation 702 to suggest connecting the "Container Tasks" and "Container Projects" data sources based on a determination that a logical connection exists between tasks and projects in typical workflow scenarios. In some embodiments, the relation recommendation 702 is generated automatically upon a determination by the workspace application or any component of the workspace application that two data sources contain related data.

In response to receiving the command to create the relation, the workspace application can prompt for creation of the relation between the new database (or data source) and one or more databases, where the one or more databases include the second database. In some embodiments, the second database is a database included in the relation recommendation 702, e.g., the second database is contained within the database container. Additionally or alternatively, the second database may not be contained within the database container. An indication of selection of the second database from among the one or more databases (e.g., the databases presented in the relation recommendation 702) can be received, and in response to receiving the selection, the workspace application can create the relation between the new database and the second database. The creation of the relation can cause display of the second database within a relation column of the new database. The relation can establish unidirectional or bidirectional connection (e.g., a two-way relation) between databases of the workspace application.

Figure 8:
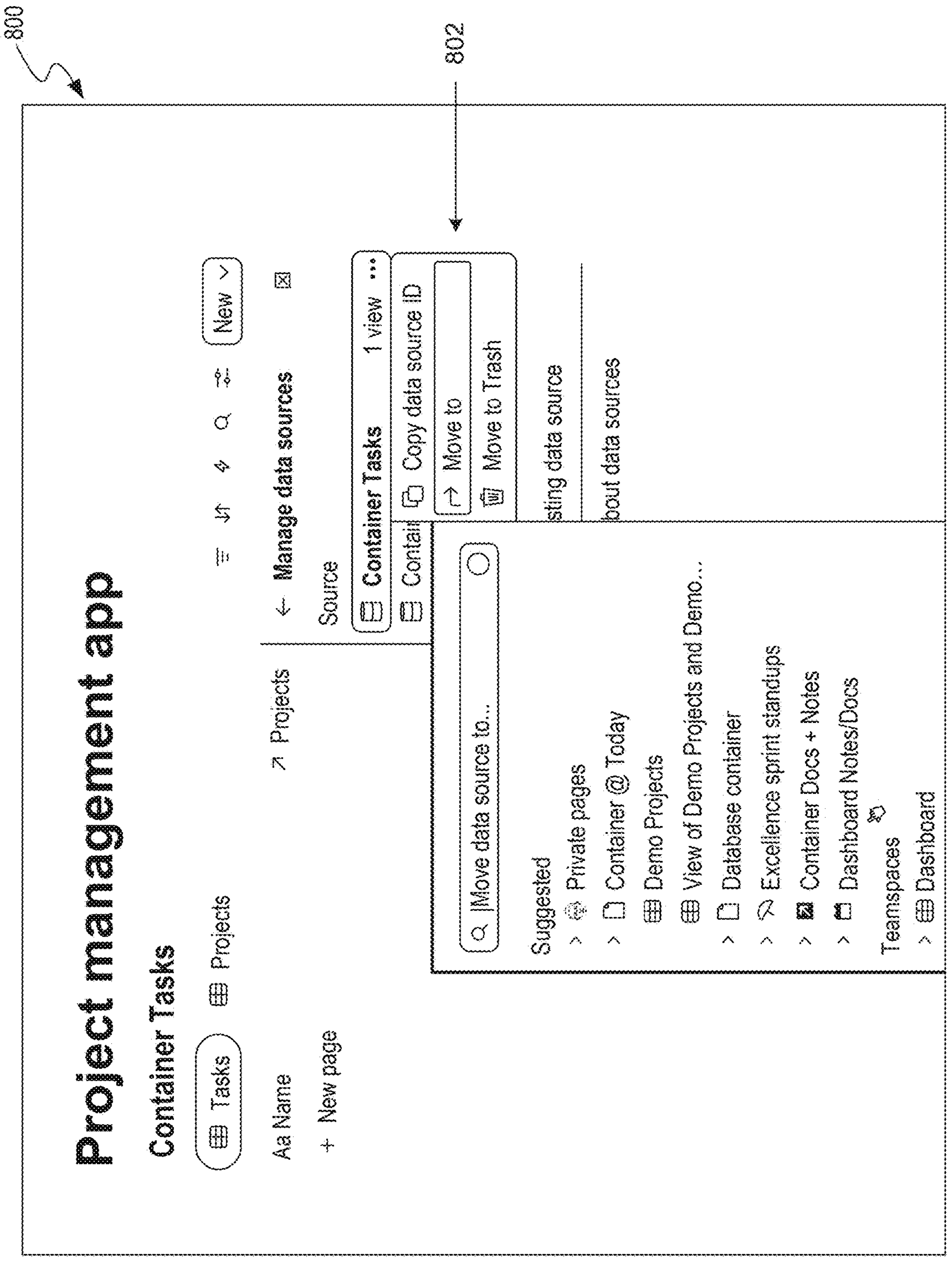
FIG. 8 illustrates an example interface in which a data source is moved from a database container.

FIG. 8 illustrates an example interface 800 in which the workspace application receives a command (e.g., a move command) to move a data source from a first database container. Upon receiving a selection of the move command selector 802, the workspace application can move data sources between different locations within the workspace application. The workspace application, the first database container, and the data source may be the same as or similar to the workspace application 404, the database container 406, and the new data source 408 as described in relation to FIG. 4. In some embodiments, the command to move a data source (e.g., new data source 408) to a second database container of the workspace application is received (e.g., move command). The data source can be contained within the first database container. The second database container may be the same as or similar to the second database container 424 as described in relation to FIG. 4. The move command selector 802 can be accessed through an interface of the workspace application by, for example, selecting (e.g., clicking on) a "manage data sources" option and selecting "move to" or a similar selection via the interface. Additionally or alternatively, the move command selector 802 can be selected via input to an AI agent of the workspace application as, for example, a natural language input.

In response to receipt of the command to move the data source (e.g., new data source 408), the workspace application can remove the data source from the first database container and contain the data source within the second database container. Through being removed from the first database container and contained within the second database container, the data source can adopt the properties associated with the second database container, such as access permissions. When moved to the second database container, the data source can be contained within the second database container, which can establish a new parent-child hierarchical relationship that governs the behavior, characteristics, and/or properties of the data source.

In some embodiments, the workspace application receives a command to move an existing data source of the workspace application to the first database container. The command to move the existing data source to the first database container can be received via a similar or the same interface as described in regard to moving the new data source to the second database container. The existing data source may be the same as or similar to the existing data source 420 as described in relation to FIG. 4 above. The existing data source can initially reside outside of the database container but within the workspace application, for example, as a linked data source, as an independent data source without a database container, or as a data source contained within the second database container.

In response to receiving the command to move the existing data source, the workspace application can remove the existing data source from outside of the database container and cause the existing data source to be contained within the first database container. When moved, the existing data source can be contained within the first database container such that the existing data source adopts the properties of the first database container, including associated access permissions of the first database container.

The move command selector 802, when selected, can provide users with the ability to reorganize data sources, for example, in response to change in workflow requirements over time. Data sources can be created within one database container of the workspace application and later moved in response to a determination that the data sources would be more appropriately organized within a different database container. The move command can allow for reorganization of data within the workspace application without requiring data sources to be recreated or data manually transferred between different database containers within the workspace application.

In some embodiments, the move command includes one or more validation mechanisms that verify the requested move of the data source(s) before the workspace application moves the data source(s). The workspace application can check for data conflicts and/or permission restrictions that could result from moving a data source between different database containers. Validation of the move requested via the move command can prevent data corruption and/or moves of data sources that would result in errors and/or failed moves.

Figure 9A:
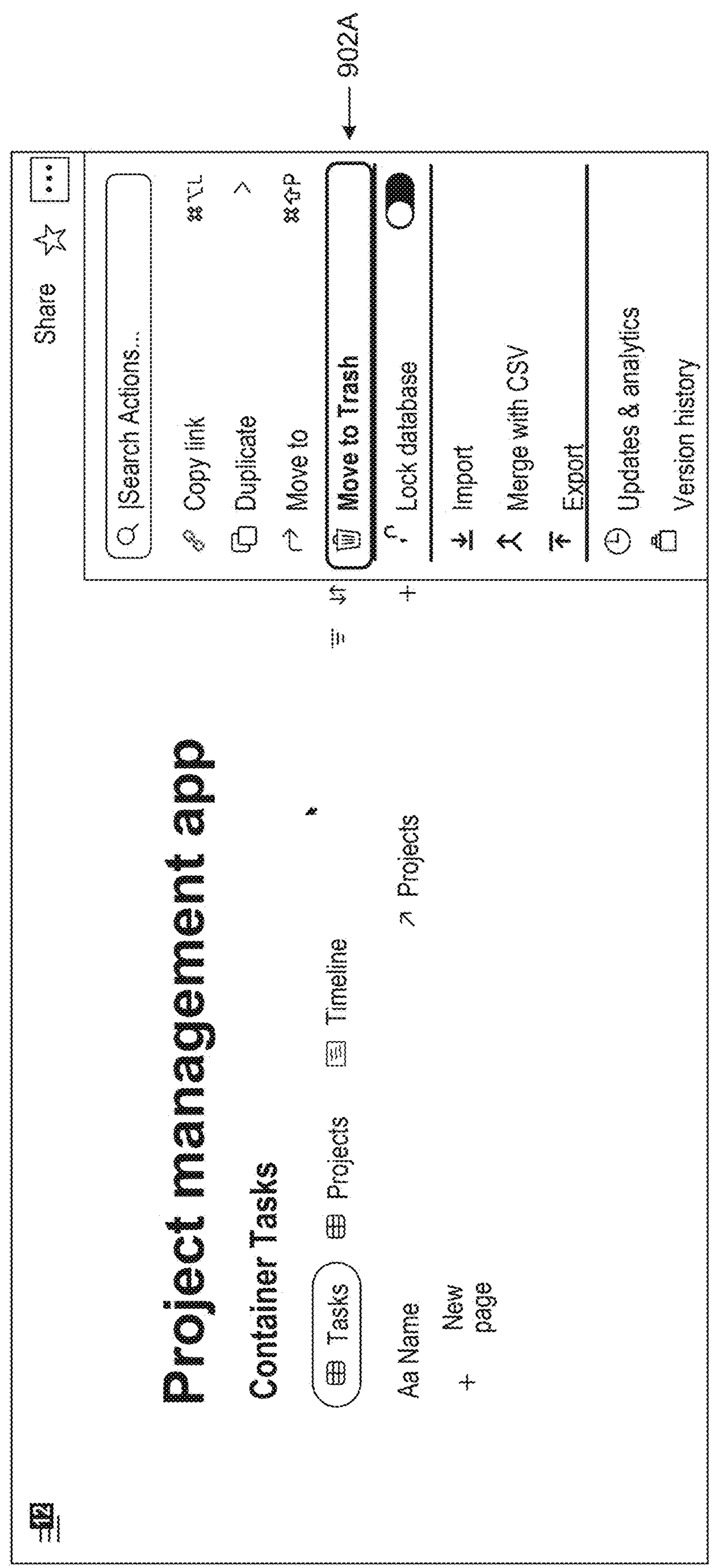
FIG. 9A illustrates an example interface in which a command to delete a database container is received.

FIG. 9A illustrates an example interface 900A in which the workspace application receives a request to delete a database container. The database container may be the same as or similar to the database container 406 as described in relation to FIG. 4. The workspace application receives the request to delete the database container upon receiving a selection of the delete database container request selector 902A. The workspace application may be the same as or similar to the workspace application 404 as described in relation to FIG. 4. The request to delete the database container can be received via user interface interaction such as clicking or tapping the delete database container request selector 902A or other input mechanisms (e.g., input to an AI agent of the workspace application).

Figure 9B:
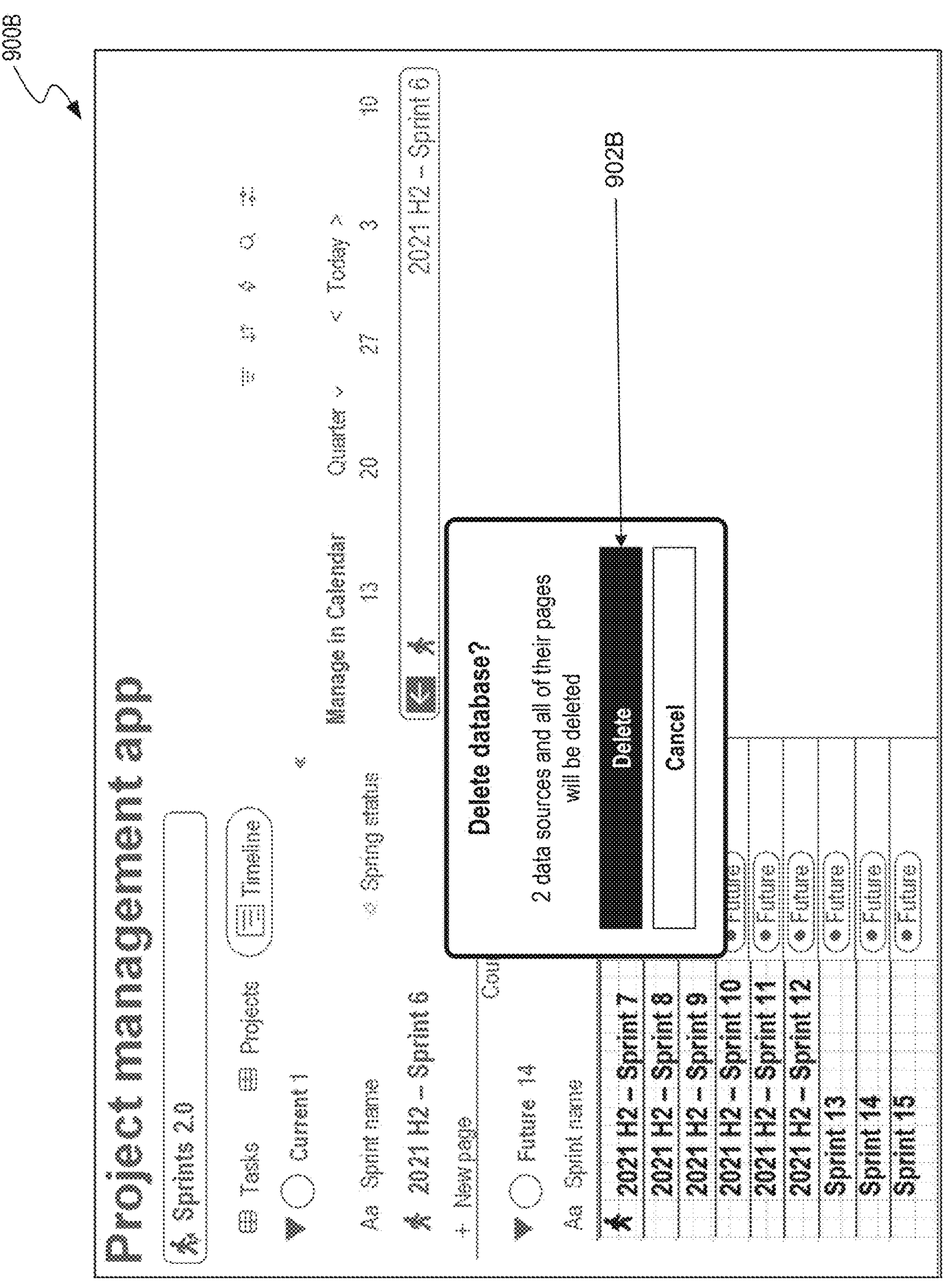
FIG. 9B illustrates an example interface including a request to confirm deletion of one or more data sources contained within a database container.

FIG. 9B illustrates an example interface 900B including a request to confirm deletion of one or more data sources contained within a database container. As shown in FIG. 9B, in response to receiving the request to delete the database container, confirmation 902B can be requested by the workspace application to delete one or more data sources contained within the database container. The workspace application may be the same as or similar to the workspace application 404 as described in relation to FIG. 4. In some embodiments, the confirmation 902B is prompted via the workspace application. By prompting for confirmation 902B, the workspace application can provide a UI element to receive the confirmation. As an example, an AI agent of the workspace application receives the request to delete the database container and prompts for confirmation 902B via a message in a chat interface. Further examples of the AI agent of the workspace application are provided below in relation to FIGS. 11A and 11B.

In response to receipt of the confirmation 902B, the workspace application can delete the one or more databases contained within the database container. The confirmation 902B can be received when a "Delete" button or similar interface element that indicates an intention to proceed with the deletion operation is selected. The confirmation process can serve as a safety mechanism that prevents inadvertent deletion of data sources from the workspace application.

In the example of FIG. 9A and FIG. 9B, the database container displays three data sources; two data sources are contained within the database container and one data source is linked to the database container but not contained within the database container. In the continued example, upon receipt of the request to delete the database container, the workspace application indicates that only two data sources will be deleted. The data sources contained within the database container, which are owned and/or managed by the database container, are able to be deleted by deleting the database container. However, linked data sources, which are fundamentally different in the structure of the workspace application, are not deleted by delete operations. Rather, the view of the linked data source can be deleted by deleting the database container. Upon deletion of a database container to which an existing data source is linked, the existing data source can continue to exist in its respective location within the workspace application and can maintain properties and/or access permissions. Deleting the database container can remove the contained data sources and/or all associated data, including pages, records, and other content that resides within the contained data sources.

Figure 10:
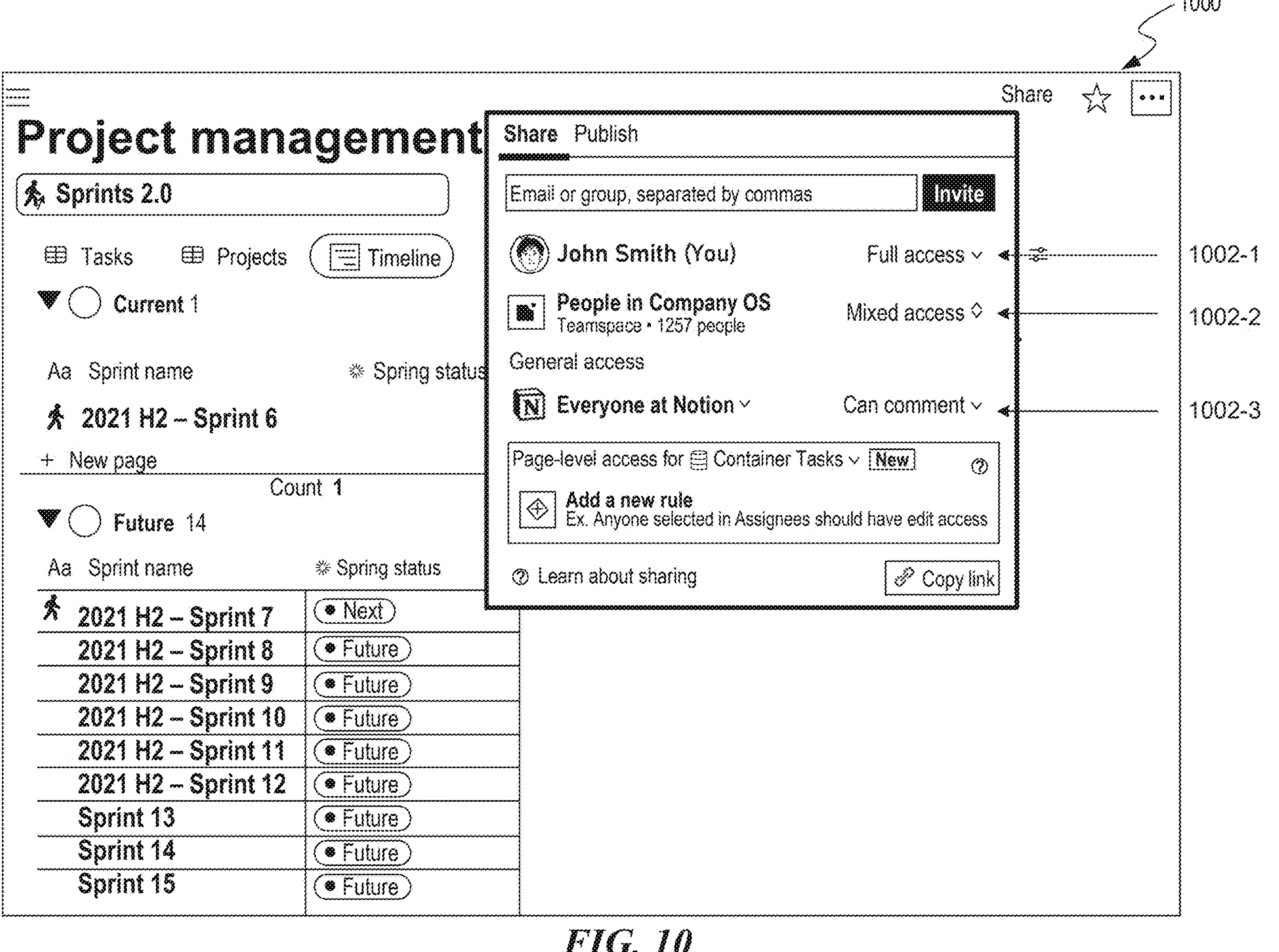
FIG. 10 illustrates an example interface for permission management by a database container.

FIG. 10 illustrates an example of an interface 1000 of permissions configuration of a database container of a workspace application. The workspace application may be the same as or similar to the workspace application 404 as described in relation to FIG. 4. The interface 1000 includes a first set of access permissions 1002 of a database container. The database container may be the same as or similar to the database container 406 as described in relation to FIG. 4. In some embodiments, the first set of access permissions 1002 includes multiple access permissions for the database container, which can include a first access permission 1002-1, a second access permission 1002-2, and/or a third access permission 1002-3. The first set of access permissions 1002 can include permissions that allow a database container, for example, to be viewed, be commented on, have content edited, or have the structure of the database container or the blocks within the database container edited (e.g., the blocks discussed in relation to FIG. 1) within the workspace application, including pages, workspaces, databases (data sources), or any other data representation within the workspace application. For example, as depicted in FIG. 10, a first access permission 1002-1 permits full access to the database container and, therefore, all data sources contained within the database container. Additionally or alternatively, the second access permission 1002-2 permits a mixed access level to "People in Company OS," a teamspace of multiple users. A mixed access level associated with the first set of access permissions can allow, for example, the database container to be viewed but not edited, or edited but not deleted, or any combination thereof. The third access permission 1002-3, in the example of FIG. 10, allows "Everyone at Notion" the ability to comment on the database container or any data sources (databases) contained therein. The first set of access permissions 1002 is not limited to the specific examples of access permissions described above, but rather the first set of access permissions 1002 can contain any access permission of the workspace application.

In some embodiments, an access permission of the first set of access permissions 1002 is changed. The first set of access permissions 1002 can determine a corresponding set of access permissions of each data source contained within the database container. As described above, the database container acts as the parent to each data source contained within the database container, determining properties of each data source contained within the database container, including access permissions. In response to the access permission being changed, the change can be propagated in the corresponding set of access permissions of each data source contained within the database container. The propagation of the change of the access permission of the first set of access permissions 1002 of the database container to each data source contained within the database container can ensure that all contained data sources automatically adopt the modified access permission. The propagation can occur automatically without manual intervention (e.g., a user manually changing the access permission for each data source contained within the database container) for each contained data source. The control of the first set of access permissions 1002 at the database container level and propagating changes to the data source level can improve an efficiency of managing access permissions to the data sources of the workspace application.

In some embodiments, change of the access permission in the second set of access permissions of the existing data source is forgone to retain a different access permission from the first set of access permissions. In such embodiments, the existing data source can be a data source linked to the database container rather than a data source contained within the database container. The differences in permission inheritance and management for contained data sources and linked data sources can provide for enhanced and/or customizable control over access permissions within the workspace application.

In some embodiments, a set of properties of the database container can be a first set of properties, and a set of properties of the existing data source can be a second set of properties. A property of the first set of properties of the database container can be changed, where a set of properties of each data source contained within the database container mirrors the first set of properties. The mirroring of properties between the database container and the contained data sources can ensure that contained data sources maintain the same or similar configuration of the database container.

In response to the property being changed, the workspace application can cause a corresponding property of each data source contained within the database container to be changed. In some embodiments, changing the corresponding property of each data source contained within the database container impacts various characteristics of the contained data sources, including, but not limited to, organizational settings, display configurations, and/or other functional parameters that govern how the contained data sources operate within the workspace application.

Change to the corresponding property of the existing data source can be forgone when the property of the database container is modified. The existing data source can retain the second set of properties, preserving the independent characteristics and/or configuration of the existing data source. The difference in property and property change inheritance between contained data sources and linked data sources can allow linked data sources to maintain configurations that differ from the properties applied to contained data sources within the database container.

The permission and property management mechanisms illustrated in the interface 1000 can improve an administrative efficiency of the workspace application by providing for control over contained data sources while preserving the independence of linked data sources. Permissions or properties can be modified at the database container level and automatically applied to all or nearly all contained data sources. Additionally or alternatively, permissions or properties can be changed granularly at the individual data source level, where the changes do not propagate upward in the hierarchy to the database container or laterally to other data sources contained within the database container.

FIG. 11A illustrates an example interface 1100A of providing a first command 1102A to create a new data source to an (AI) agent of a workspace application. The interface 1100A includes the first command 1102A and an input interface 1104A that can be utilized by, for example, users of the workspace application to provide instructions to an AI agent of the workspace application. The workspace application may be the same as or similar to the workspace application 404 as described in relation to FIG. 4 above. The first command 1102A can be input within the input interface 1104A. The first command 1102A can be provided in the form of a prompt. The prompt is a natural language query, instruction, and/or other communication received via a text interface, audio interface, and/or another interface of the workspace application that describes a task for the AI agent to be performed within the workspace application. Additionally or alternatively, the first command 1102A can be provided as input to an AI agent of the workspace application via an interface of the workspace application other than input interface 1104A. In some embodiments, the first command 1102A is provided automatically to the AI agent by the workspace application upon receiving the first command 1102A to add the new data source to the database container.

In some embodiments, the AI agent is configured to interpret natural language instructions included as part of the first command 1102A and translate the instructions into actions and/or a plan for creating and/or configuring database containers and associated data sources. As shown in the example of FIG. 11A, the first command 1102A can include instructions such as "Build me a CRM inside this database container." In the context of this example, CRM refers to "Customer Relationship Management."

The AI agent can be configured to create database containers that are able to be populated based on the first command and/or subsequent prompts (e.g., commands and/or requests) received through the input interface 1104A. For example, the AI agent can be configured with a set of tools, where the AI agent utilizes tools from the set of tools to add the new data source to the database container. When the AI agent receives instructions to create a specific type of workflow, such as a CRM, the AI agent can automatically generate appropriate data sources, establish relations between the data sources, and configure a set of properties of the database container and the data sources contained within the database container to support the functionality requested via the first command 1102A.

FIG. 11B illustrates an interface 1100B of a database container 1102B created by an AI agent within a workspace application. The workspace application may be the same as or similar to the workspace application 404 as described in relation to FIG. 4 above. In the example of FIG. 11B, the database container 1102B is labeled as "CRM" in reference to the first command that commanded the AI agent to build a CRM database container. The first command may be the same as or similar to the first command 1102A as described in relation to FIG. 11A above. The database container 1102B contains multiple data sources including Companies, Contacts, and Deals that are automatically generated by the AI agent based on the input of the first command. In the example of FIG. 11B, the data source titled "Deals" is shown and includes columns such as "Deal Name," "Company," "Primary Contact," and "Amount."

In response to receiving the first command as input, the AI agent generates the database container 1102B and the data sources contained within the database container. In the example of FIG. 11B, the "Deals" data source includes a relation column 1104B in which the "Companies" data source is able to be displayed. Relations can be automatically established by the AI agent as connections between the data sources created within the database container 1102B as a result of a semantic analysis of the first command. The AI agent may determine that creating the relation would likely improve the organization and/or display of the data sources contained within the database container, improving an efficiency of the workspace application. The AI agent can analyze relationships between different data sources of the container, as well as those existing outside of the database container, and automatically create appropriate relations that support the database container functionality.

The ability to input the first command to the AI agent either directly or indirectly, and the resulting database container creation process performed by the AI agent, can improve template creation within the workspace application by providing template creators with the capabilities to combine complex workflows into a single database container. Rather than requiring template creators to, for example, hide databases in toggles or distribute components across separate pages, the AI agent can create comprehensive workflow templates within a single database container or multiple database containers that provide a central location within the workspace application to access many related data sources. Further, database containers created and/or managed by the AI agent can allow template creators to produce workflow templates (e.g., the CRM database container) that can be easily understood and utilized without requiring extensive setup instructions and/or navigation guidance.

Example Database Container Method Flow

Figure 12:
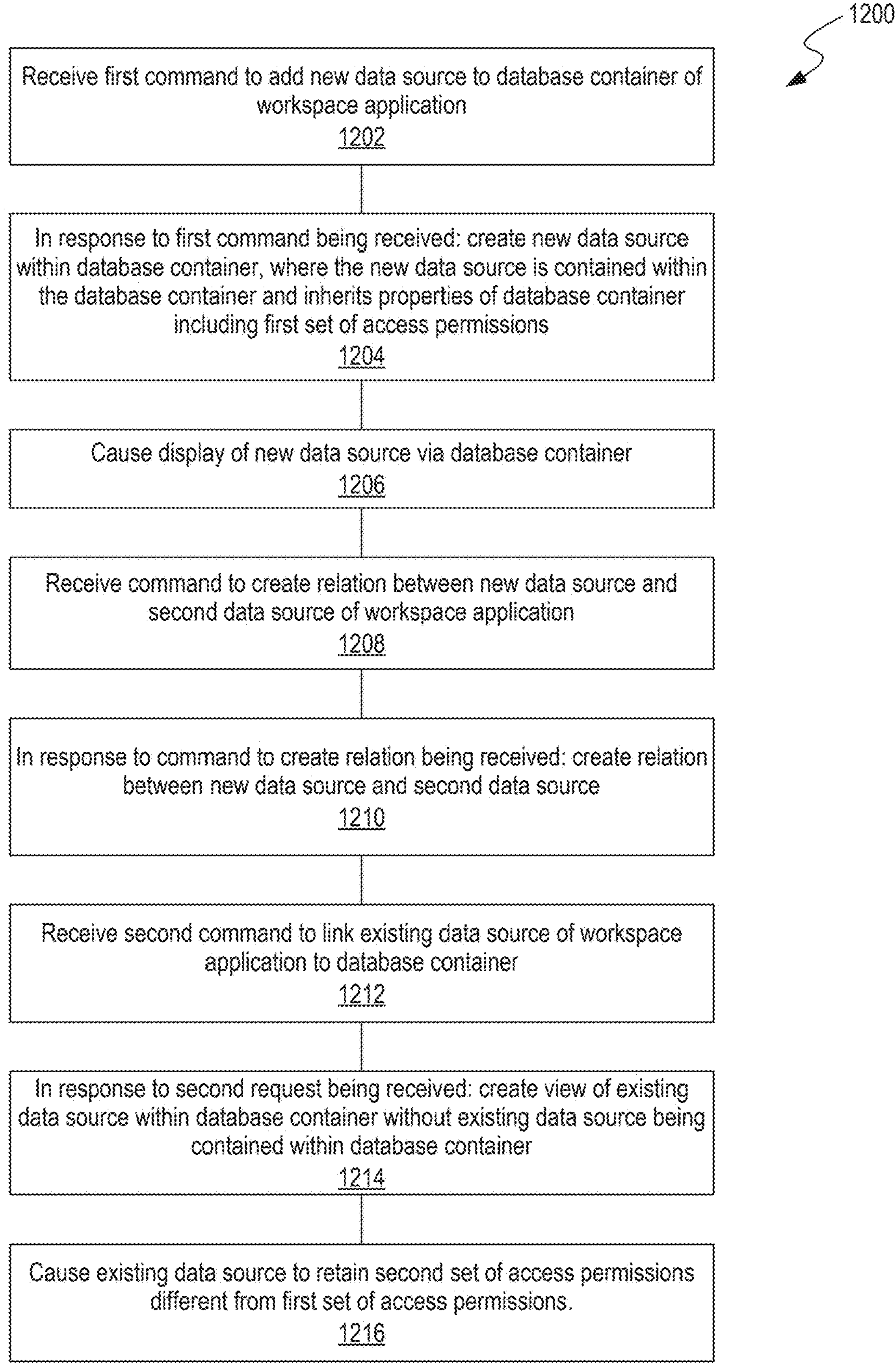
FIG. 12 is a flow diagram illustrating an example method of creating a database container within a workspace application.

FIG. 12 is a flow diagram illustrating an example method 1200 of creating a database container within a workspace application. In some embodiments, the method 1200 is performed by components of the example computer system illustrated and described in more detail in relation to FIG. 13 below and/or the workspace application 404. Likewise, embodiments can include different and/or additional operations or can perform the operations in different orders.

At 1202, the workspace application receives a first command to add a new data source to a database container of the workspace application. The workspace application and the database container may be the same as or generally similar to the workspace application 404 and the database container 406 as described in relation to FIG. 4 above. The database container may be configured to contain multiple data sources. The first command may be the same as or generally similar to the first command 402 as described in relation to FIG. 4 above. The first command can be received through any of various input mechanisms, including via user interface(s) of the workspace application, programmatic instructions, and/or automated processes within the workspace application. The new data source may be the same as or generally similar to the new data source 408 as described in relation to FIG. 4 above. Additionally or alternatively, the first command can be provided as a request, which can invoke a response or confirmation from the workspace application, in contrast to a command.

At 1204, in response to receipt of the first command, the workspace application creates the new data source within the database container. The new data source can be contained within the database container, establishing a hierarchical relationship between the database container and the new data source. The database container can act as a parent to the new data source such that the new data source inherits properties of the database container including a first set of access permissions. The first set of access permissions can include permissions that, for example, govern how users and other components of the workspace application interact with the new data source, including viewing rights, editing capabilities, commenting permissions, and/or administrative controls. The inheritance of properties can ensure that the new data source automatically adopts certain characteristics and/or behaviors from the database container, which can create consistency across data sources contained within the database container.

At 1206, the new data source is displayed via the database container. The display of the new data source can include visual indicators, representations, and/or other interface elements that facilitate interaction (e.g., user interaction) with the new data source while maintaining the hierarchical relationship with the database container.

At 1208, a command is received by the workspace application to create a relation between the new data source and a second data source of the workspace application. The second data source may be the same as or generally similar to the second data source 414-1 or the second data source 414-2 as described in relation to FIG. 4 above. The second data source can be contained either within the database container or outside of the database container but within the workspace application. The command to create the relation can be received via a user interface of the workspace application, programmatic commands, and/or automated processes within the workspace application. Additionally or alternatively, the command can be provided as a request, which can invoke a response or confirmation from the workspace application, in contrast to a command. In some embodiments, a recommendation to create the relation between the new data source and one or more data sources contained within the database container is generated as output by the workspace application. The recommendation may be the same as or generally similar to the relation recommendation 416 as described in relation to FIG. 4 above. The recommendation can be generated based on data source names, content types, structural similarities, and/or other contextual factors that semantically suggest a relationship between the data sources. The recommendation can be displayed, and a selection of the second data source can be received. In some embodiments, the command to create the relation is a request to create a two-way relation between the new data source and the second data source. The two-way relation can establish a bidirectional connection where each data source automatically displays relation columns that reference the other data source involved in the relation.

At 1210, in response to receiving the command to create the relation, the workspace application creates the relation between the new data source and the second data source. The relation may be the same as or generally similar to the relation 412 as described in relation to FIG. 4 above. Creating the relation can cause display of the second data source within a relation column of the new data source. In some embodiments, where the command is a request to create a two-way relation, the second data source can be displayed within a relation column of the new data source, and the new data source can be displayed within a relation column of the second data source. The two-way relation can enable reciprocal referencing and/or change reconciliation between the data sources, allowing changes in one data source to be reflected in the related data source automatically.

At 1212, a second command is received by the workspace application to link an existing data source of the workspace application to the database container. The existing data source may be the same as or generally similar to the existing data source 420 as described in relation to FIG. 4 above. The existing data source can reside outside of the database container but within the workspace application. Additionally or alternatively, the existing data source can reside outside of the workspace application altogether. The second command may be the same as or generally similar to the second command 418 as described in relation to FIG. 4 above. The second command can be received through various input mechanisms within the workspace application, including via user interface(s), programmatic instructions, and/or automated processes. In some embodiments, the existing data source is contained within a second database container of the workspace application. The second database container may be the same as or generally similar to the second database container 424 as described in relation to FIG. 4 above. The second database container can provide organizational structure and hierarchical property management for the existing data source, similar to how the database container manages its respective contained data sources.

At 1214, in response to receipt of the second command, the workspace application creates a view of the existing data source within the database container without the existing data source being contained within the database container. The view may be the same as or generally similar to the view 422 as described in relation to FIG. 4 above. The view can provide a representation or interface element that allows users to access and interact with the existing data source from within the context of the database container while preserving the existing data source in its location within the database container. The creation of the view can enable users to access other data sources from the database container without disrupting existing organizational structures or hierarchical relationships within the workspace application.

At 1216, the existing data source retains a second set of access permissions different from the first set of access permissions. The second set of access permissions can be inherited from the second database container or can be independently configured for the existing data source. The retention of the second set of access permissions can ensure that the existing data source maintains its security configuration and access permissions when the view is created within the database container.

In some embodiments, the workspace application receives a request to delete the database container, and, in response, the workspace application requests confirmation to delete one or more data sources contained within the database container. Confirmation to delete the one or more data sources can be received, and in response to the confirmation being received, the workspace application can delete the one or more data sources contained within the database container. The deletion process can remove the contained data sources and all associated data elements (e.g., pages) while preserving linked data sources that reside outside the database container.

In some embodiments, the first command to add the new data source to the database container is provided as input to an AI agent of the workspace application. The AI agent can be configured to interpret natural language instructions and translate the instructions into actions for creating and/or configuring database containers and contained and linked data sources. The AI agent can automatically generate data sources within the database container and establish relations between the data sources.

In some embodiments, the database container is a first database container, and a command to move the new data source to a second database container of the workspace application is received. In response to receiving the command to move the new data source, the workspace application can remove the new data source from the first database container and contain the new data source within the second database container. Moving the new data source to the second database container can cause the new data source to adopt the properties and/or access permissions associated with the second database container.

In some embodiments, the workspace application receives a command to move the existing data source to the database container, and in response to receipt of the command to move the existing data source, the workspace application can remove the existing data source from outside the database container and can cause the existing data source to be contained within the database container. The existing data source can transition from being a linked data source to a data source that resides within, or is contained within, the database container. The database container can act as the parent governing the properties and access permissions of the contained existing data source. In some embodiments, an access permission of the first set of access permissions of the database container is changed, where the first set of access permissions determines a corresponding set of access permissions of each data source contained within the database container. In response to the access permission being changed, the workspace application can propagate the change of the access permission in the corresponding set of access permissions of each data source contained within the database container and can forgo change of the access permission in the second set of access permissions of the existing data source to retain a different access permission from the first set of access permissions.

Computer System

Figure 13:
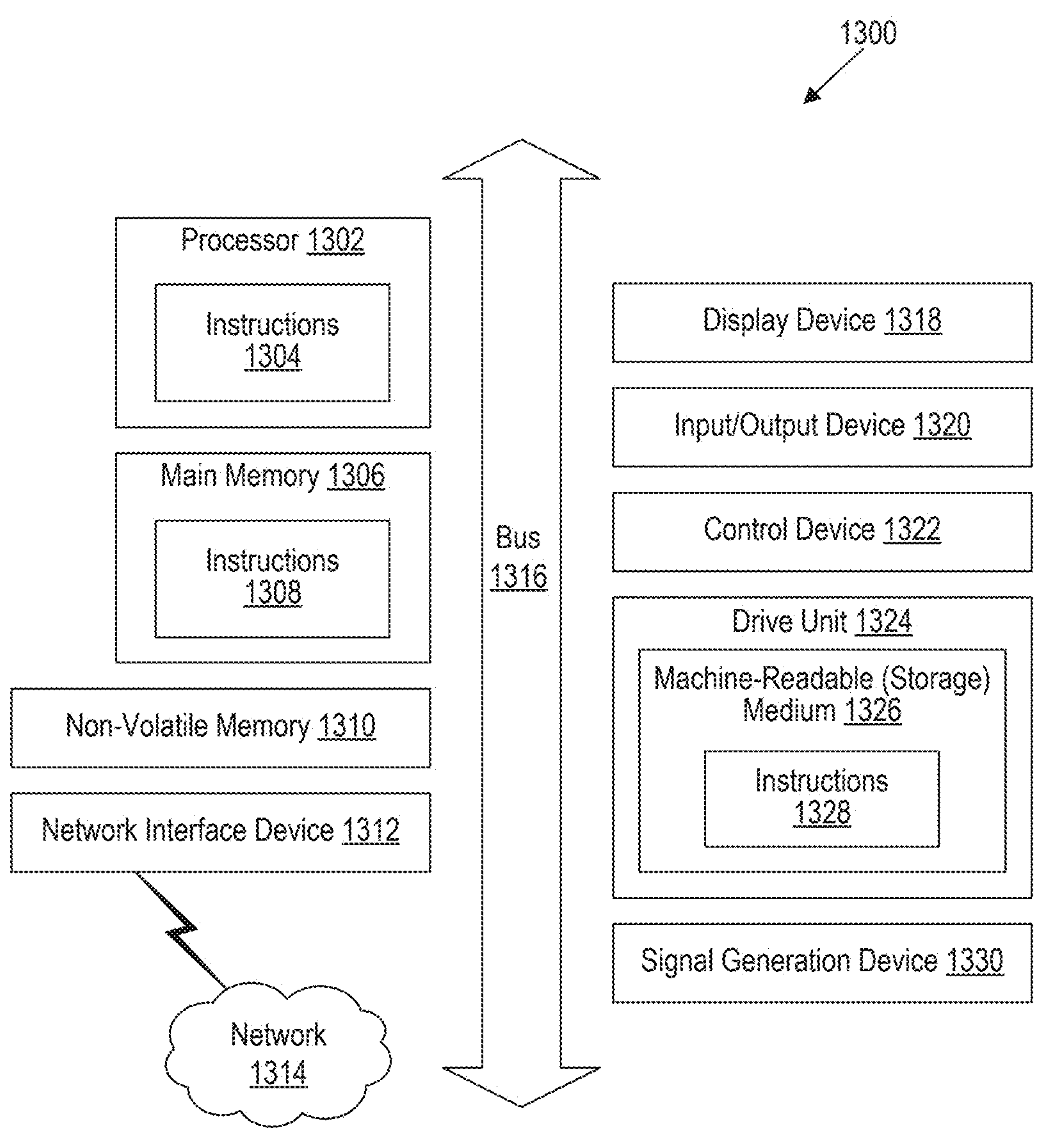
FIG. 13 is a block diagram that illustrates an example of a computer system in which at least some operations described herein can be implemented.

FIG. 13 is a block diagram that illustrates an example of a computer system 1300 in which at least some operations described herein can be implemented. As shown, the computer system 1300 can include: one or more processors 1302, main memory 1306, non-volatile memory 1310, a network interface device 1312, a display device 1318, an input/output device 1320, a control device 1322 (e.g., keyboard and pointing device), a drive unit 1324 that includes a machine-readable (storage) medium 1326, and a signal generation device 1330 that are communicatively connected to a bus 1316. The bus 1316 represents one or more physical buses and/or point-to-point connections that are connected by appropriate bridges, adapters, or controllers. Various common components (e.g., cache memory) are omitted from FIG. 13 for brevity. Instead, the computer system 1300 is intended to illustrate a hardware device on which components illustrated or described relative to the examples of the figures and any other components described in this specification can be implemented.

The computer system 1300 can take any suitable physical form. For example, the computer system 1300 can share a similar architecture as that of a server computer, personal computer (PC), tablet computer, mobile telephone, wearable electronic device, network-connected ("smart") device (e.g., a television or home assistant device), augmented reality/virtual reality (AR/VR) system (e.g., head-mounted display), or any electronic device capable of executing a set of instructions that specify action(s) to be taken by the computer system 1300. In some implementations, the computer system 1300 can be an embedded computer system, a system-on-chip (SOC), a single-board computer (SBC) system, or a distributed system such as a mesh of computer systems or include one or more cloud components in one or more networks. Where appropriate, one or more computer systems 1300 can perform operations in real time, near real time, or in batch mode.

The network interface device 1312 enables the computer system 1300 to mediate data in a network 1314 with an entity that is external to the computer system 1300 through any communication protocol supported by the computer system 1300 and the external entity. Examples of the network interface device 1312 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 1306, non-volatile memory 1310, machine-readable medium 1326) can be local, remote, or distributed. Although shown as a single medium, the machine-readable medium 1326 can include multiple media (e.g., a centralized/distributed database and/or associated caches and servers) that store one or more sets of instructions 1328. The machine-readable medium 1326 can include any medium that is capable of storing, encoding, or carrying a set of instructions for execution by the computer system 1300. The machine-readable medium 1326 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 1310, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1304, 1308, 1328) set at various times in various memory and storage devices in computing device(s). When read and executed by the processor 1302, the instruction(s) cause the computer system 1300 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described that can be exhibited by some examples and not by others. Similarly, various requirements are described that can be requirements for some examples but not other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," or any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the Detailed Description above using the singular or plural number can also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the Detailed Description above explicitly defines such terms. Accordingly, the actual scope of the invention encompasses not only the disclosed examples but also all equivalent ways of practicing or implementing the invention under the claims. Some alternative implementations can include additional elements to those implementations described above or include fewer elements.

Any patents and applications and other references noted above, and any that can be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

We claim:

1. A non-transitory, computer-readable storage medium comprising instructions recorded thereon, wherein the instructions, when executed by at least one data processor of a system configured to manage a workspace application including multiple data sources, cause the system to:

receive a first command to add a new data source to a database container of the workspace application,
  wherein the database container is configured to contain multiple data sources;

in response to the first command being received:
  create the new data source within the database container,
    wherein the new data source is contained within the database container,
    wherein the database container acts as a parent to the new data source such that the new data source inherits properties of the database container including a first set of access permissions, and
    wherein the workspace application enforces access to the new data source in accordance with the first set of access permissions;
  cause display of the new data source via the database container;
  receive a command to create a relation between the new data source and a second data source of the workspace application,
    wherein the second data source is contained within the workspace application;

in response to the command to create the relation being received:
  create the relation between the new data source and the second data source,
    wherein creating the relation causes display of the second data source within a relation column of the new data source;

receive a second command to link an existing data source of the workspace application to the database container,
  wherein the existing data source resides outside of the database container but within the workspace application; and in response to the second command being received:
  create a view of the existing data source within the database container without the existing data source being contained within the database container; and
  cause the existing data source to retain a second set of access permissions different from the first set of access permissions,
    wherein the workspace application enforces access to the existing data source in accordance with the second set of access permissions.

2. The non-transitory, computer-readable storage medium of claim 1, wherein the system is further caused to:

receive a request to delete the database container; and in response to the request being received:
  request confirmation to delete one or more data sources contained within the database container;

receive the confirmation to delete the one or more data sources; and in response to the confirmation being received, delete the one or more data sources contained within the database container.

3. The non-transitory, computer-readable storage medium of claim 1, wherein the system is further caused to:

generate a recommendation to create the relation between the new data source and one or more data sources contained within the database container;

cause display of the recommendation; and receive a selection of the second data source.

4. The non-transitory, computer-readable storage medium of claim 1, wherein the command to create the relation is a request to create a two-way relation between the new data source and the second data source, and wherein the system is further caused to:

cause the display of the second data source within the relation column of the new data source; and cause display of the new data source within a relation column of the second data source.

5. The non-transitory, computer-readable storage medium of claim 1, wherein the first command to add the new data source to the database container is provided, as input, to an AI agent of the workspace application.

6. The non-transitory, computer-readable storage medium of claim 1, wherein the database container is a first database container, and wherein the system is further caused to:

receive a command to move the new data source to a second database container of the workspace application; and in response to the command to move the new data source being received, cause the new data source to be removed from the first database container and contained within the second database container.

7. The non-transitory, computer-readable storage medium of claim 1, wherein the system is further caused to:

receive a command to move the existing data source to the database container; and in response to the command to move the existing data source being received, cause the existing data source to be removed from outside the database container and to be contained within the database container.

8. The non-transitory, computer-readable storage medium of claim 1, wherein the system is further caused to:

change an access permission of the first set of access permissions of the database container, wherein the first set of access permissions determines a corresponding set of access permissions of each data source contained within the database container; and in response to the access permission being changed:

propagate the change of the access permission in the corresponding set of access permissions of each data source contained within the database container; and forgo change of the access permission in the second set of access permissions of the existing data source to retain a different access permission from the first set of access permissions.

9. A non-transitory, computer-readable storage medium comprising instructions recorded thereon, wherein the instructions, when executed by at least one data processor of a system, cause the system to:

receive a first command to add a new database to a database container of a workspace application, wherein the database container is configured to contain multiple databases;

in response to the first command being received:

create the new database within the database container, wherein the new database is contained within the database container, wherein the database container acts as a parent to the new database such that the new database inherits a set of properties including a first set of access permissions of the database container, and wherein the workspace application enforces access to the new database in accordance with the first set of access permissions; and cause display of the new database via the database container;

receive a second command to link an existing database of the workspace application to the database container, wherein the existing database resides outside of the database container but within the workspace application; and in response to the second command being received:

create a view of the existing database within the database container without causing the existing database to be contained within the database container, wherein creating the view of the existing database within the database container causes the existing database to retain a set of properties including a second set of access permissions different from the set of properties of the database container, and wherein the workspace application enforces access to the existing database in accordance with the second set of access permissions.

10. The non-transitory, computer-readable storage medium of claim 9, wherein the system is further caused to:

receive a command to create a relation between the new database and a second database of the workspace application, wherein the second database is contained within the workspace application; and in response to the command to create the relation being received:

prompt for creation of the relation between the new database and one or more databases, the one or more databases including the second database;

receive an indication of selection of the second database from among the one or more databases; and in response to the selection being received, create the relation between the new database and the second database, wherein creating the relation causes display of the second database within a relation column of the new database.

11. The non-transitory, computer-readable storage medium of claim 9, wherein the system is further caused to:

receive a request to delete the database container; and in response to the request being received:

prompt for confirmation to delete one or more databases contained within the database container; and in response to the confirmation being received, delete the one or more databases contained within the database container.

12. The non-transitory, computer-readable storage medium of claim 9, wherein the first command to add the new database to the database container is provided, as input, to an AI agent of the workspace application.

13. The non-transitory, computer-readable storage medium of claim 9, wherein the database container is a first database container, and wherein the system is further caused to:

receive a command to move the new database to a second database container of the workspace application; and in response to the command to move the new database to the second database container, move the new database from the first database container to within the second database container, wherein, when moved, the new database is contained within the second database container.

14. The non-transitory, computer-readable storage medium of claim 9, wherein the system is further caused to:

receive a command to move the existing database to the database container; and in response to the command to move the existing database to the database container, move the existing database from outside the database container to within the database container, wherein, when moved, the existing database is contained within the database container.

15. The non-transitory, computer-readable storage medium of claim 9, wherein the set of properties of the database container is a first set of properties, the set of properties of the existing database is a second set of properties, and wherein the system is further caused to:

change a property of the first set of properties of the database container, wherein a set of properties of each database contained within the database container mirrors the first set of properties; and in response to the property being changed:

change a corresponding property of each database contained within the database container; and forgo change to the corresponding property of the existing database.

16. A method comprising:

receiving a first request to add a new database to a database container of a workspace application, wherein the database container is a database that is configured to contain multiple databases;

in response to receiving the first request:

creating the new database to be contained within the database container, wherein the new database inherits a first set of properties including a first set of access permissions of the database container, and wherein the workspace application enforces access to the new database in accordance with the first set of access permissions;

receiving a second request to link an external database, located outside of the database container, to the database container; and in response to receiving the second request:

creating a view of the external database within the database container without causing the external database to be contained within the database container; and causing the external database to retain a second set of properties including a second set of access permissions different from the first set of properties, wherein the workspace application enforces access to the external database in accordance with the second set of access permissions.

17. The method of claim 16, further comprising:

receiving a request to create a relation between the new database and a second database of the workspace application, the second database being contained within the workspace application; and in response to the request to create the relation being received:

creating the relation between the new database and the second database; and causing display of the second database within a relation column of the new database.

18. The method of claim 16, further comprising:

providing, as input, the first request to add the new database to the database container to an AI agent of the workspace application.

19. The method of claim 16, further comprising:

receiving a request to move the new database to a second database container of the workspace application; and in response to receiving the request to move the new database to the second database container:

causing the new database to be removed from the database container and contained within the second database container.

20. The method of claim 16, wherein the external database is located outside of the workspace application.

* * * * *